United States Patent [19]
Braun et al.

[11] Patent Number: 5,955,193
[45] Date of Patent: Sep. 21, 1999

[54] APPAREL CONTAINING CORRUGATED MICROFIBER-CONTAINING THERMAL INSULATION

[75] Inventors: David L. Braun, Lake Elmo; James E. Steffen; Raju Venkatapathy, both of Woodbury, all of Minn.

[73] Assignee: Minnesota Mining and Manufacturing Company, St. Paul, Minn.

[21] Appl. No.: 08/794,080

[22] Filed: Feb. 4, 1997

Related U.S. Application Data

[62] Division of application No. 08/449,517, May 23, 1995, Pat. No. 5,639,700, which is a division of application No. 08/093,398, Jul. 19, 1993, Pat. No. 5,753,343, which is a continuation-in-part of application No. 07/925,384, Aug. 4, 1992, abandoned.

[51] Int. Cl.[6] ...................................................... D02G 3/00

[52] U.S. Cl. ........................ 428/362; 428/298.4; 428/369; 428/359; 428/364; 428/903; 156/62.2

[58] Field of Search ..................................... 428/296, 297, 428/298, 299, 224, 359, 364, 362, 369, 298.1, 298.4, 300.7, 903, 371, 360; 156/62.2, 62.4

[56] References Cited

U.S. PATENT DOCUMENTS

| | | |
|---|---|---|
| 4,118,531 | 10/1978 | Hauser . |
| 4,617,124 | 10/1986 | Pall et al. ................................ 210/638 |
| 4,759,782 | 7/1988 | Miller et al. ............................... 55/487 |
| 4,837,067 | 6/1989 | Carey, Jr. et al. . |
| 4,845,862 | 7/1989 | Phillips, Jr. et al. . |
| 4,908,263 | 3/1990 | Reed et al. . |
| 4,929,492 | 5/1990 | Carey, Jr. et al. . |
| 4,939,016 | 7/1990 | Radwanski et al. ..................... 428/152 |
| 4,988,560 | 1/1991 | Meyer et al. ............................ 428/297 |
| 5,032,122 | 7/1991 | Joel et al. ................................ 604/391 |
| 5,038,775 | 8/1991 | Maruscak et al. .................. 128/205.27 |

FOREIGN PATENT DOCUMENTS 0 079 414  5/1983  European Pat. Off. .......... E04B 1/78

*Primary Examiner*—Merrick Dixon
*Attorney, Agent, or Firm*—Karl G. Hanson

[57] ABSTRACT

Apparel having thermal insulation containing a corrugated nonwoven web and a means for retaining the shape of a corrugated web. The shape-retaining means is not coextensive with the corrugated nonwoven web and is secured to the valleys of the corrugations. The corrugated nonwoven web has a solidity of 0.1 or less and contains microfiber and crimped staple fibers that have a percent crimp of at least 15 percent.

9 Claims, 9 Drawing Sheets

| COMPOSITE STRUCTURE | NUMBER LAYERS BMF | NUMBER LAYERS SCRIM | CONFIGURATION (SIDE ELEVATION) |
| --- | --- | --- | --- |
| a | 1 | 1 | |
| b | 2 | 1 | |
| c | 3 | 2 | |
| a' | 1 | 1 | |
| b' | 2 | 1 | |
| c' | 3 | 2 | |

FIG. 12

APPAREL CONTAINING CORRUGATED MICROFIBER-CONTAINING THERMAL INSULATION

This application is a divisional application of prior application Ser. No. 08/449,517, filed on May 23, 1995 U.S. Pat. No. 5,639,700 which is a division of application Ser. No. 08/093,398, filed Jul. 19, 1993 U.S. Pat. No. 5,753,343 which is a continuation-in-part of application Ser. No. 07/925,384, filed Aug. 4, 1992, now abandoned.

TECHNICAL FIELD

This invention relates to (i) a composite structure containing a corrugated, nonwoven web of polymeric microfiber; (ii) a fibrous-filtration-face-mask (hereinafter face mask) having a corrugated filtration layer, (iii) thermal insulation that includes a corrugated, nonwoven web of polymeric microfiber; (iv) a filter for removing particulate and gaseous contaminants from a fluid; (v) a method of making a corrugated, nonwoven web of polymeric microfiber; and (vi) a corrugating apparatus.

BACKGROUND OF THE INVENTION

Corrugated Microfiber Webs

Corrugated and pleated webs of polymeric microfiber are known in the art and have been disclosed in the following U.S. patents: U.S. Pat. Nos. 5,038,775, 4,939,016, 4,910,064, 4,842,739, 4,826,642, 4,774,001, 4,759,782, 4,676,807, and 4,617,124.

U.S. Pat. No. 5,038,775 discloses a filter assembly that includes a pleated microfibrous web as a filter medium. The filter medium is maintained in a pleated condition by a scrim that extends over the upstream and downstream sides of the pleated filter medium to provide substantially continuous support to the filter medium.

U.S. Pat. No. 4,939,016 discloses a composite web material that includes a hydraulically entangled laminate of melt blown microfibers and a further layer, preferably at least one of pulp fibers, staple fibers, melt blown fibers, and continuous filaments, with or without particulate material. The patent discloses that this composite web can be formed into a corrugated stretchable fabric by pre-stretching the web and hydraulically entangling the web while stretched.

U.S. Pat. No. 4,910,064 discloses a nonwoven web that has a multiplicity of substantially longitudinally molecularly oriented continuous filaments of a thermoplastic polymer. Onto the longitudinal continuous filaments are deposited a multiplicity of melt blown fibers having fiber diameters of 0.5 to 50 micrometers ($\mu$m). The melt blown fibers form bonds at some of their intersections with the longitudinal continuous filaments to stabilize and fix the orientation of those filaments. The stabilized continuous filaments are pleated or corrugated and are stabilized in that condition by depositing a layer of melt blown fibers on one side of the pleats or corrugations (column 26, lines 12–16).

U.S. Pat. No. 4,842,739 discloses a high surface area filter cartridge that contains a nested arrangement of disk-shaped filter layers. The disk-shaped filter layers have a pattern of regular radial pleats and comprise a laminate that includes an upstream prefilter layer, a filtration media, and a downstream cover layer. The filtration media can be a nonwoven web of melt blown microfibers. The filter laminate is pleated by an embossing operation.

U.S. Pat. Nos. 4,826,642 and 4,774,001 disclose a composite structure that is useful as a flat filtration medium or as a pleated (corrugated) filtration structure. The composite structure comprises a microporous membrane and a synthetic thermoplastic web of microfibers secured to the microporous membrane by melt blowing the microfibers thereon.

U.S. Pat. Nos. 4,759,782 and 4,676,807 disclose a cylindrical filter structure that may comprise a single pleated filter medium supported by an outer perforated, cylindrical support cage. The filter media may comprise organic melt blown microfibers. In Example 1, a composite, cylindrical pleated filter structure was prepared from two layers of melt-blown polyester fibrous material having two glass fiber layers sandwiched therebetween. The melt-blown polyester fibrous material contained fibers having diameters ranging from 35 to 50 $\mu$m, and was calendared to a thickness of 0.009 inches (pore size was 100 $\mu$m) before being combined with the glass fiber medium. The composite structure was placed in pleated form in a perforated polypropylene cage. No disclosure is provided as to how the composite structure is pleated.

U.S. Pat. No. 4,617,124 discloses a polymeric, microfibrous filter sheet where the microfiber is coated with a cured thermosetting binding resin or polymer. In column 24, lines 29–31, it is disclosed that the filter sheet can be placed in pleated form and incorporated into a cartridge.

Face Masks

Nonwoven webs of polymeric microfiber have been commonly used in face masks as filtration layers. U.S. Pat. Nos. 4,807,619, 4,536,440, 4,215,682, and 3,802,429 disclose cup-shaped face masks that have nonwoven webs of polymeric microfiber as filtration layers.

Face masks have been disclosed that have corrugated or pleated surfaces. U.S. Pat. Nos. 4,807,619, 4,641,645, 4,536,440, 4,248,220, 3,985,132, 3,220,409, and EP-A 0,149,590 A3 disclose such face masks. Of these patents, only U.S. Pat. No. 4,641,645, however, discloses a filter that includes a corrugated nonwoven web of polymeric microfiber. In U.S. Pat. No. 4,641,645, the face mask has a middle layer of polymeric microfiber disposed coextensively between two polyester nonwoven webs. All three layers are assembled into a composite mat and molded into a cup-shaped configuration having a plurality of tightly-compacted rib elements. While the tightly-compacted rib elements have peaks and valleys that provide the face mask with a corrugated effect, the tightly-compacted rib elements are employed to give the face mask structural strength (not to improve filtration performance), and they reduce the loftiness of the middle layer of polymeric microfiber and also do not substantially increase the effective surface area of the filter.

A number of different approaches have been taken to increase the effective filtering surface area of a face mask; see, for example, U.S. Pat. Nos. 4,883,547 and 4,827,924, and EP-A 0,469,498 A2. EP-A 0,469,498 A2, in particular, discloses a particle-filtering half mask that has a folded filter layer disposed between exterior and interior cover layers. The folded filtering layer is made of a porous, flexible filtering material that is folded in an overlapping arrangement. A holding strip extending transverse to the fold direction is glued to the folds to ensure that they lie flat. Other than indicating that the filter layer may be a multi-layer fiber fleece, EP-A 0,469,498 A2 does not disclose the composition of the filtering material. Nor does the document disclose how the filtering layer is placed in a folded condition, and no disclosure is made in regard to preserving the loft of the filtering material during the manufacture of the folded filter.

Thermal Insulation

Nonwoven webs that contain polymeric microfiber are known to be useful as thermal insulation. U.S. Pat. No.

4,118,531 to Hauser discloses a nonwoven web that contains polymeric microfiber intermixed with crimped staple fiber. This nonwoven web demonstrates very good thermal resistance but lacks sufficient integrity to allow the web to be adhesively bonded to another surface and to allow the web to maintain a cohesive structure after being subjected to abrasion. Used as insulation for footwear and gloves and other apparel, the nonwoven web can be exposed to abrasion that can cause the web to be released from the surface to which it is adhered and also may cause the web to lose structure and form clumps in the apparel. To overcome these problems, the nonwoven web may be embossed. Embossing, however, compresses the web and reduces its loft and therefor lowers its thermal resistance. To raise the overall thermal resistance, more layers of embossed web must be employed, having the undesirable result of increasing the weight and cost of the apparel.

Corrugating Apparatus

Legions of corrugating apparatuses have been disclosed in the past century. The corrugating apparatus art is replete with devices that employ mating gears to corrugate a flat web; see, for example, U.S. Pat. Nos. 4,116,603, 3,998,140, 3,905,857, 3,792,952, 3,723,213, 3,157,551, 3,025,963, 2,051,025 and 1,290,800. Reciprocating corrugating devices also are well known in the corrugating apparatus art; see, for example, U.S. Pat. Nos. 4,650,102, 4,239,201, and 1,822,509. More recently, in U.S. Pat. No. 4,874,457 a corrugating apparatus has been disclosed which corrugates a flat web by (i) introducing the flat web onto the ends of radially-extending paddles and then (ii) moving the ends of the radially-extending paddles towards each other to cause the web to corrugate. The paddles move about a path that has a curved portion and a straight portion, and the apparatus corrugates the flat web when the paddles move from the curved portion of the path to the straight portion. The web is maintained in a corrugated condition by passing the web under an oven to bond adjacent folds of the corrugated web together. An optional cover layer can be introduced onto the tops of the corrugations and also is passed under the oven to fuse the cover layer to the corrugations to stabilize the corrugated web.

SUMMARY OF THE INVENTION

The present invention provides a composite structure that comprises a corrugated, nonwoven web of polymeric microfiber (NWPM) and a means for retaining the shape of the corrugated NWPM. The corrugated NWPM has an average pore size of less than 150 $\mu$m, a solidity of 0.1 or less, and a plurality of generally parallel corrugations. The shape-retaining means extends across the generally parallel corrugations and is secured to the corrugated NWPM at valleys of the generally parallel corrugations such that the shape-retaining means is not coextensive with the corrugated NWPM between two adjacent valleys.

In another aspect, the present invention provides a face mask that comprises a composite structure that is formed to fit over the nose and mouth of a person. The composite structure includes a corrugated NWPM that has a solidity of 0.1 or less and a means for retaining the corrugated shape of the corrugated NWPM. The shape-retaining means is secured to the corrugated NWPM at the valleys of the corrugations such that the shape-retaining means is not coextensive with the corrugated NWPM between two adjacent valleys.

In a further aspect, the present invention provides a filter capable of removing particulate and gaseous contaminants from the air. The filter comprises first and second filter elements secured to each other and having a shape adapted for attachment to a respirator. The first filter element comprises a corrugated NWPM having a solidity of 0.1 or less for removing particulate contaminants, and the second filter element comprises a sorbent material for removing gaseous contaminants. A means for retaining the corrugated shape of the NWPM is secured to the corrugated NWPM at valleys of the corrugations.

In a still further aspect, the present invention provides thermal insulation that comprises a corrugated nonwoven web and a means for retaining the shape of the corrugated nonwoven web. The corrugated nonwoven web has a solidity of 0.1 or less and contains a mixture of microfiber and crimped staple fibers that have a percent crimp of at least fifteen percent. The shape-retaining means being secured to valleys of the corrugations in the nonwoven web such that the shape-retaining means is not coextensive with the corrugated nonwoven web.

In a still further aspect, the present invention provides a new method of making a corrugated NWPM. The method comprises:
(a) introducing a NWPM having a solidity of 0.1 or less into a corrugating apparatus that has a plurality of paddles secured at a first end to a means for moving the paddles about a path, the NWPM making contact with spaced second ends of the paddles opposite to the paddles' first ends; and
(b) reducing the spacing between the second ends of the paddles to cause the NWPM to become corrugated, wherein the corrugated nonwoven web of polymeric microfiber has a solidity of 0.1 or less.

In a still further aspect, the present invention provides a corrugating apparatus that comprises:
(a) first and second paddles each attached at a first end to a means for moving the first and second paddles about a path, the first and second paddles extending radially from the moving means, and each paddle having a second end for supporting a web as the first and second paddles move about the path, the second ends of the first and second paddles being able to move towards each other to cause the web to corrugate; and
(b) an ultrasonic welding device located downstream to where the web is corrugated, the ultrasonic welding device having a horn and an anvil, where the anvil includes the second ends of the first and second paddles, the ultrasonic welding device causing the corrugated web to form a bond with the shape-retaining means between the horn and the anvil where the corrugated web makes contact with the second edges of the first and second paddles.

A NWPM needs to be maintained in a lofty condition to obtain optimal filtration performance. Filtration parameters such as pressure drop and service life can be negatively impacted when a NWPM is compacted. A NWPM is delicate and thus care must be taken when handling such a web because it can be easily compacted and torn.

In this invention, a composite structure has been made that comprises a lofty, corrugated NWPM. The lofty, corrugated NWPM has been made notwithstanding the delicate nature of a NWPM. Using the method and apparatus of this invention, minimal contact is made with the NWPM throughout the corrugation process to avoid compacting the web. This enables a corrugated NWPM to be made without sacrificing the web's loft. Web loft is measured by solidity, a parameter that defines the solids fraction in a volume of web. Lower solidity values are indicative of greater web loft.

A NWPM undergoes minimal changes in solidity when corrugated using the method and apparatus of this invention to provide a corrugated NWPM, where the NWPM has solidity of less than 0.1. The NWPM is held in a corrugated condition by securing a shape-retaining means to the valleys of the corrugations such that the shape-retaining means is not coextensive with the corrugated NWPM. This composite structure provides superior filtration performance over a flat NWPM, and this superior performance is demonstrated contemporaneously in three important filtration parameters: particle penetration, pressure drop, and service life. A corrugated NWPM also can provide good thermal resistance. The performance parameters pertaining to filtration and insulation incur no substantial detrimental effects when a NWPM is corrugated in accordance with the present invention.

The above novel features and advantages of the invention are more fully shown and described in the drawings and the following detailed description, where like reference numerals are used to represent similar parts. It is to be understood, however, that the drawings and detailed description are for the purposes of illustration only and should not be read in a manner that would unduly limit the scope of this invention.

GLOSSARY

In describing this invention:

The term "arithmetic median fiber diameter" means the fiber diameter for which equal numbers of fibers have diameters that lie above or below this value. The arithmetic median fiber diameter can be determined through microscopic examination.

"Corrugated" means a surface that has peaks and valleys extending over that surface;

"Corrugated surface area" (CSA) means the width of a corrugated web multiplied by its length, where the length is taken along the corrugated web's "sinusoidal-type" path.

"Effective surface area" (ESA) means the area of a web available for filtering. In a corrugated web, the ESA is equal to the CSA less the areas that are blinded off. By "blinded off" is meant those areas of web that are rendered fluid inaccesible or fluid-impermeable. For example, a web can become fluid impermeable where the shape-retaining means is secured (e.g., melt bonded, adhesive bonded, ultrasonically welded, etc.) to the corrugated web.

The term "microfiber" means fibers that have an arithmetic median fiber diameter of less than 15 $\mu$m.

The term "pitch" means the center-to-center distance between the second ends of the paddles.

The term "nonwoven web of polymeric microfiber" (NWPM) means an entangled mass of fibers that has an arithmetic median fiber diameter of less than 15 $\mu$m.

The term "solidity" means the volume of fibers per volume of web. It is a unitless fraction typically represented by $\alpha$:

$$\alpha = \frac{m_f}{\rho_f L_f},$$

where $m_f$ is the fiber mass per sample surface area, which in the case of corrugated webs is the CSA; $\rho_f$ is the fiber density; and $L_f$ is the filter thickness, which in the case of corrugated NWPM is the NWPM thickness. Solidity is used herein to refer to the NWPM itself and not to the composite structure as a whole. When a NWPM contains mixtures of two or more kinds of fibers, the individual solidities are determined for each kind of fiber using the same $L_f$, and these individual solidities are added together to obtain the web's solidity, $\alpha$.

The term "average pore size" (also known as average pore diameter) is related to the arithmetic median fiber diameter and web solidity and can be determined by the following formula:

where D is the average pore size, $d_f$ is arithmetic median fiber diameter, and $\alpha$ is the web solidity.

$$D = d_f \left\{ \left( \frac{2\alpha}{\pi} \right)^{-\frac{1}{2}} - 1 \right\}$$

BRIEF DESCRIPTION OF THE DRAWINGS

FIG. 12 illustrates side views of the different composite structures used in Examples 1–4 and C-1 to C-16.

DETAILED DESCRIPTION OF THE PREFERRED EMBODIMENTS

In describing the preferred embodiments of this invention, specific terminology will be used for the sake of clarity. The invention, however, is not intended to be limited to the specific terms so selected, and it is to be understood that each term so selected includes all the technical equivalents that operate similarly.

Figure 1:
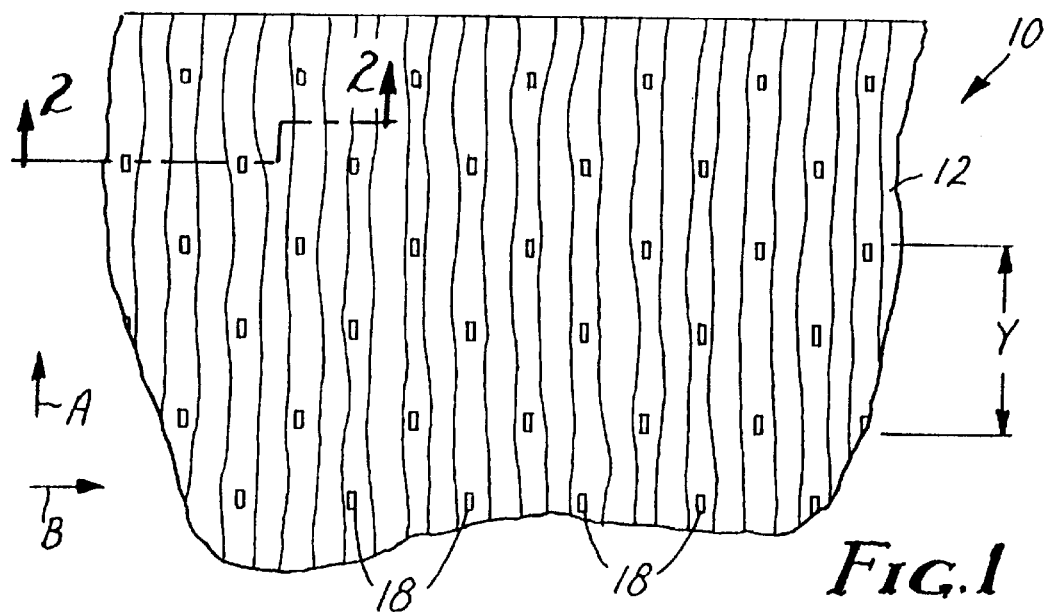
FIG. 1 is a top view of a composite structure 10 in accordance with this invention.
Figure 2:
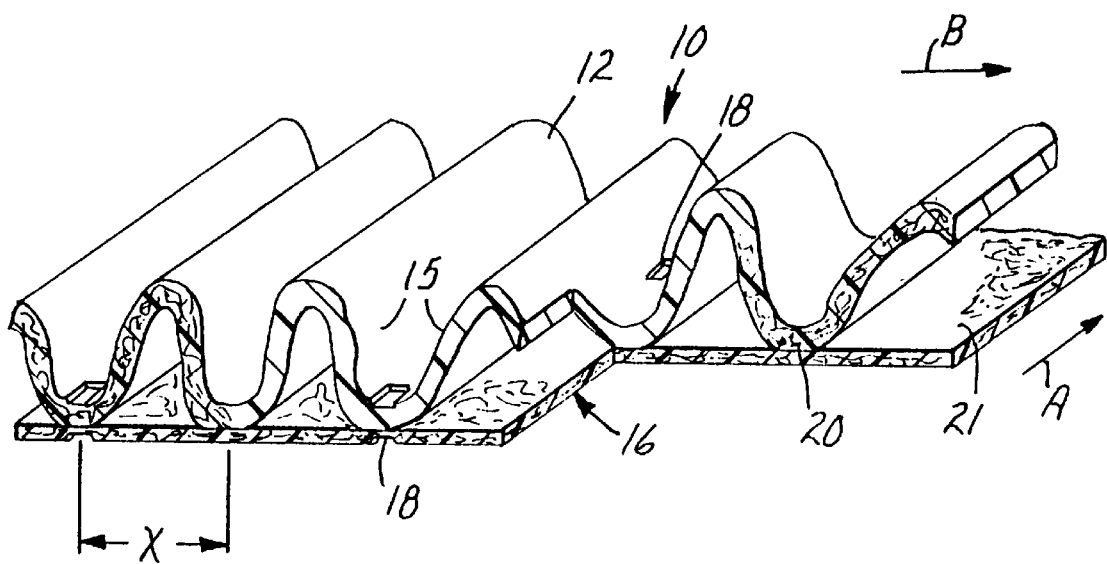
FIG. 2 is a cross-section of composite structure 10 of FIG. 1 taken along lines 2—2.

In FIGS. 1 and 2, there is illustrated an example of a composite structure 10 according to this invention. Composite structure 10 includes a corrugated NWPM 12. Corrugated NWPM 12 is secured to a means 16 for retaining the corrugated shape of the NWPM 12 at the valleys 20 of the NWPM 12. Although a valley 20 may become a "peak" by inverting NWPM 12, for purposes of simplicity, the term "valley" will be primarily the only term used herein. As best shown in FIG. 2, the corrugated NWPM 12 preferably follows an approximately sinusoidal-type curve when viewed from a side elevation. Adjacent sides 15 of adjacent corrugations preferably do not overlap or make substantial contact with each other to a significant degree. Shape-retaining means 16 is not coextensive with corrugated NWPM 12; that is, it does not follow the same approximately sinusoidal-type path as the corrugated NWPM. As shown, shape-retaining means 16 can have a length substantially less than the length of the corrugated NWPM 12 between two adjacent valleys 20. Shape-retaining means 16 preferably extends between two adjacent valleys as a substantially straight line when viewed from a side elevation. The straight line distance between two adjacent valleys 20 is referred to herein as the "chord length" and is noted in FIG. 2 by the letter X.

The chord length, generally, is about 10 to 85 percent of the length of the corrugated NWPM between two adjacent valleys. The ratio of the length of corrugated NWPM 12 to the chord length of the shape-retaining means may vary depending on the ultimate utility of the composite structure but generally is about 10:1 to 1.2:1, and more typically 5:1 to 1.5:1. This ratio is referred to as the corrugation ratio.

Corrugated NWPM 12 can be secured to shape-retaining means 16 by thermomechanical bonding (for example, ultrasonic welds), adhesive bonding (for example, hot melt bonding), mechanical means (for example, sewing), or other suitable means. The bond between corrugated NWPM 12 and shape-retaining means 16 can extend along the whole length of a valley 20 when shape-retaining means 16 is a sheet or fabric 21. In a preferred embodiment, corrugated NWPM 12 is secured to shape-retaining means 16 by intermittent securement points 18, preferably ultrasonic welds, located exclusively on valleys 20. Securement points 18 are preferably spaced on each valley 20 by a distance Y (FIG. 1), and may be offset from securement points 18 on an adjacent valley by a distance of about one-half Y. The value of Y can vary depending on, for example, the size of securement points 18 and the size of corrugations 12. In general, however, Y is about 0.5 to 5 centimeters (cm).

By staggering the securement points on adjacent valleys 20, the number of securement points 18 can be minimized per unit of exposed surface area of composite structure. This result is particularly beneficial when composite structure 10 is used as a filter because, in filtering applications, it is desirable to have a maximum ESA. Minimizing the CSA used for securement helps maximize the ESA, and in so doing increases the service life of the filter and provides a lower pressure drop across the filter or composite structure 10. Minimizing the CSA used for securement also may promote the thermal resistance of the composite structure 10. A composite structure 10 of this invention can have less than 10 percent, preferably less than 5 percent, and more preferably less than 2 percent of the CSA used for securement. In a more preferred embodiment, less than 0.5 percent of the CSA is used for securement. Further, it has been discovered that the use of intermittent securement points 18 does not substantially hamper the composite structure's conformability or its use as a filter in a face mask.

Composite structure 10 can be conformed or bent around axis A that extends parallel to the linear corrugations, as well as around axis B that extends transverse to the linear corrugations 12. This conformability permits the composite structure to be particularly useful as a filter for a cup-shaped face mask or as thermal insulation in a garment or footwear. The degree of conformability may vary depending on the particular shape-retaining means; however, if shape-retaining means 16 is not particularly rigid, composite structure 10 may be bent around axis A at a bend radius as small as about ten percent of the composite structure thickness. Composite structure 10 may be bent around axis B at a bend radius as small as about the thickness of composite structure 10. For compound bending around axis A and B, the minimum bend radius is about equal to the thickness of composite structure 10.

The particular composition and construction of the composite structure 10 may vary with its intended utility.

The peak to valley height of a corrugated NWPM can vary but typically is about 2 to 30 millimeters (mm), more typically 3 to 15 mm. For a face mask, the peak to valley height is about 4 to 8 mm. For thermal insulation, the peak to valley height typically is about 4 to 50 mm, more typically about 10 to 25 mm.

The NWPM has an arithmetic median fiber diameter of less than about 15 $\mu$m, preferably less than about 10 $\mu$m, and more preferably in the range of about 2 to 8 $\mu$m.

The NWPM, in general, has a basis weight in the range of about 25 to 100 grams per square meter (g/m$^2$) before being corrugated, and more typically, the basis weight is in the range of 35 to 70 g/m$^2$.

The NWPM in corrugated form has a solidity of about 0.1 or less, more preferably in the range of 0.04–0.08. For a face mask application, the solidity of the corrugated NWPM preferably is in the range of about 0.05 to 0.08. For thermal insulation, the solidity of a corrugated NWPM typically is in the range of about 0.008 to 0.07.

The NWPM has an average pore size of less than about 150 $\mu$m and in preferred embodiments the pore size is greater than 10 $\mu$m, more preferably in the range of about 15 to 100 $\mu$m.

For filtration purposes, the NWPM preferably contains at least 50 weight percent polymeric microfiber based on the weight of the fibrous material. More preferably, the NWPM contains 80 weight percent polymeric microfiber, and most preferably approximately one hundred 100 weight percent polymeric microfiber based on the weight of fibrous material. The NWPM may contain fibers larger than microfibers such as larger diameter staple fibers (see, U.S. Pat. No. 4,988,560 to Meyer et al. which discloses a web that contains polymeric microfiber and crimped staple fiber to provide a web of increased porosity).

The fibers of the NWPM are randomly entangled as a coherent mass of fibers. The fibers can be entangled by, for example, a melt-blowing process, where a molten polymer is forced through a die and the extruded fibers are attenuated by adjacent high velocity air streams to form an entangled mass of blown microfiber (BMF). BMF webs made in this manner are held together by autogenous bonding. A process for making BMF webs is disclosed in Wente, Van A., "Superfine Thermoplastic Fibers" 48 *Industrial Engineering Chemistry,* 1342 et seq (1956); or see Report No. 4364 of the Naval Research Laboratories, published May 25, 1954, entitled "Manufacture of Super Fine Organic Fibers" by Wente, Van A.; Boone, C. D.; and Fluharty, E. L. A NWPM that contains fibers other than polymeric microfibers such as crimped or uncrimped staple fibers may be prepared according to procedures discussed in U.S. Pat. No. 4,988,560 to Meyer et al., U.S. Pat. No. 4,118,531 to Hauser, and U.S. Pat. No. 3,016,599 to Perry, the disclosures of which are incorporated here by reference. A NWPM may also be made using solution blown techniques such as disclosed in U.S. Pat. No. 4,011,067 to Carey or electrostatic techniques such as disclosed in U.S. Pat. No. 4,069,026 to Simm et al. The fibers in a NWPM can be electrically charged to enhance their filtration capabilities; see U.S. Pat. No. 4,215,682 to Kubik et al. and U.S. Pat. No. 4,592,815 to Nakao.

Polymeric components that may be employed in a NWPM include polyolefins such as polyethylene, polypropylene, polybutylene, poly(4-methylpentene-1), and polyolefin copolymers;-polyesters such as polyethylene terephthalate (PET), polybutylene terephthalate, and polyether ester copolymers such as HYTREL available from Dupont Co., Elastomers Division, Wilmington, Del.; polycarbonates; polyurethanes; polystyrene; and thermoplastic elastomer block copolymers such as styrene-butadiene-styrene, styrene-isoprene-styrene, styrene-ethylene/butylene-styrene, available from Shell Oil Company, Houston, Tex., under the trademark KRATON. Combinations of the above polymeric microfibers, or blends of the polymeric components, may also be employed. For example, a blend of polypropylene and poly(4-methyl-1-pentene) can be used to make a NWPM (see U.S. Pat. No. 4,874,399 to Reed et al.), or the NWPM may contain bicomponent microfiber such as the polypropylene/polyester fibers (see U.S. Pat. No. 4,547,420 to Krueger et al.), the disclosures of these patents are incorporated here by reference. A corrugated NWPM 12, preferably comprises fibers made from polyolefins, particularly fibers that contain polypropylene as a major fiber component (for example, greater than ninety weight percent) as such fibers can demonstrate good electrical charge retention.

A NWPM may include other ingredients in addition to the fibrous material. For instance, the NWPM may be loaded with discrete solid particles capable of interacting with (for example, chemically or physically reacting with) a fluid to which the particles are exposed. Typical particles for use in filtering or purifying include activated carbon, alumina, sodium bicarbonate, and silver particles. Such particles can remove a component from a fluid by sorption, chemical reaction, or amalgamation or a catalyst may be employed to convert a hazardous gas to a harmless form. Examples of such particle-loaded nonwoven webs of polymeric microfiber are disclosed in U.S. Pat. No. 3,971,373 to Braun, where discreet solid particles are uniformly dispersed throughout and are physically held in a NWPM. The disclosure of this patent is incorporated here by reference. Also, additives such as dyes, pigments, fillers, surfactants, abrasive particles, light stabilizers, fire retardants, absorbents, medicaments, etc., may also be added to a NWPM by introducing such components to the fiber-forming molten polymers or by spraying them on the fibers after the NWPM has been collected.

Although the corrugated NWPM illustrated in FIG. 2 has a single layer of NWPM, this invention also contemplates corrugating a plurality of layers of NWPM to make a composite structure. A composite structure therefore could comprise 2, 3, 4, etc. layers of corrugated NWPM, where each adjacent layer is secured, ultimately, to the shape-retaining means to provide a laminate of corrugated webs in the composite structure (see, for example, FIG. 12, sample b'). In a further embodiment, composite structures of this invention may be stacked upon each other to provide a resulting composite structure that comprises a plurality of layered composite structures (see, for example, FIG. 12, sample c').

Shape-retaining means 16 is an element capable of maintaining the corrugated condition of a corrugated web. In a filtering application, shape-retaining means 16 allows composite structure 10 to be fluid permeable in a direction normal to the extended surface of the composition structure and shape-retaining means 16 preferably does not hinder fluid flow through the composite structure 10 to a significant extent, and more preferably is not more restrictive to fluid flow through the composite structure 10 than the corrugated NWPM 12. Preferably, shape-retaining means 16 is sufficiently open or porous that it demonstrates a pressure drop less than the pressure drop across the corrugated NWPM 12. Also, shape-retaining means 16 preferably is deformable, allowing composite structure 10 to be conformable.

Shape-retaining means 16 is illustrated in FIGS. 1 and 2 as a fabric 21 of ultrasonically-bondable material that extends transverse and parallel to the parallel corrugations. Fabric 21 can be a porous and deformable nonwoven web such as a CELESTRA spun bond polypropylene fabric available from Fiberweb North America Inc., Simpsonville, S.C., or the fabric 21 may be a NWPM or other porous sheet-like materials including porous woven webs. Alternatively, shape-retaining means 16 may take the form of a plurality of spaced bands, filaments, or fibers extending across the parallel corrugations of NWPM 12, transverse to the parallel corrugations or displaced diagonally to the same. Such bands, filaments, or fibers are bonded at the valleys of the corrugations to maintain the corrugated shape of the NWPM 12. Examples of bands, filaments, or fibers that could be employed include: thin bands having a pressure sensitive adhesive applied thereto (for example, a thin tape); filaments coated with an adhesive; and polymeric fibers melt spun onto the valleys of the corrugated NWPM while the melt spun fibers are in a tacky condition. When polymeric fibers are employed, they preferably have a composition similar to the corrugated NWPM to permit melt bonding. A fabric 21 is the preferred form of a shape-retaining means because it allows a lower frequency of bonding to the NWPM 12, thereby increasing the ESA of NWPM 12.

Figure 3:
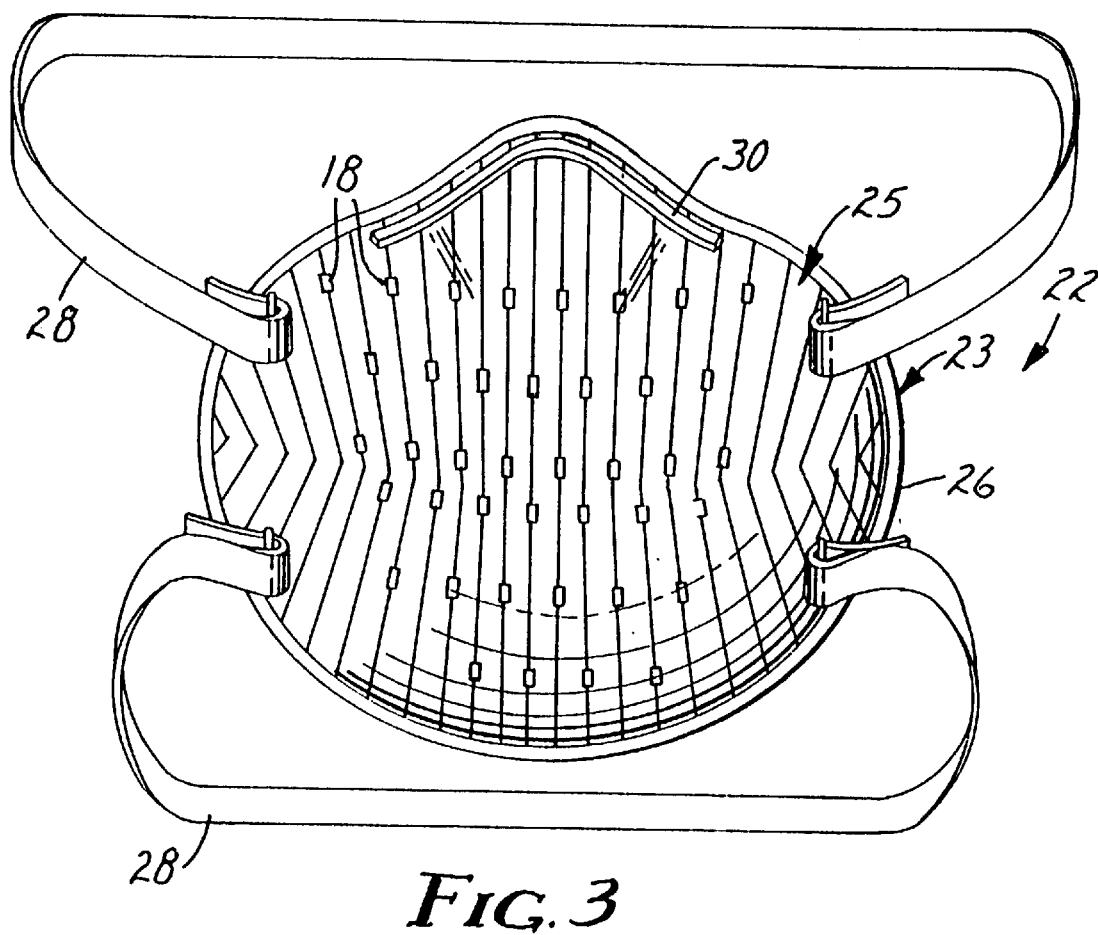
FIG. 3 is a front view of a face mask 22 in accordance with this invention.

In FIG. 3, an example of face mask 22 of this invention is illustrated. Face mask 22 has a mask body 23 that includes a corrugated filter layer 25. Corrugated filter layer 25 provides a substantially expanded ESA and a high filter efficiency without substantially increasing the size of the face mask. A face mask of this invention can have an ESA of at least 1.3 times the ESA of a face mask that is of substantially the same size but contains a non-corrugated filter layer. In general, the ESA can be increased by a factor in the range of about 1.3 to 4, more typically 1.6 to 2.5, without substantially increasing the size of the face mask. Thus, in accordance with this invention, a face mask can be provided with an ESA exceeding about 200 $cm^2$, more preferably in the range of about 250 $cm^2$ to 600 $cm^2$.

Figure 4:
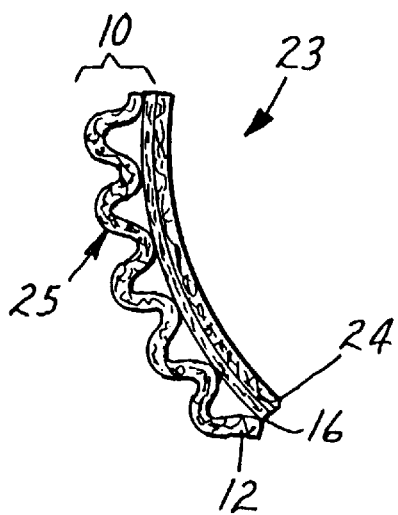
FIG. 4 is a partial cross-section of a face mask body 23.

As best shown in FIG. 4, a corrugated filter layer 25 can be a corrugated NWPM 12 held in a corrugated condition by a shape-retaining means 16 to form a composite structure 10 that is supported in a mask body 23 by a shaping layer 24. Shaping layer 24 provides shape and structure to the face mask and is porous to allow for relatively easy passage of air through the face mask. Shaping layer 24 can be located on the interior of a face mask, and shape-retaining means 16 can be disposed between shaping layer 24 and corrugated filter layer 25. Alternatively, corrugated filter layer 25 can be inverted so that shape-retaining means 16 is located on the outer side of corrugated filtration layer 25, or corrugated filter layer 25 can be placed on the inner side of shaping layer 24 with the shape-retaining means located closest to the face of the wearer. In the latter instance, shape-retaining means 16 preferably is made of a material that is soft to the touch.

Corrugated filter layer 25 preferably is a NWPM that is in a lofty condition over substantially the whole surface of the corrugated NWPM. A corrugated NWPM preferably has a solidity of 0.1 or less and does not have tightly compacted corrugations to provide structure to the mask. Corrugated filter layer 25 can be secured to shaping layer 24 by, for example, bonding corrugated filter layer 25 to a shaping layer 24 at mask base 26. The bond at mask base 26 may be formed by ultrasonic welding, sewing, an adhesive such as a hot melt adhesive or pressure sensitive adhesive, encapsulation by a thermoplastic rubber, or the like. Ultrasonic welds are the preferred means for bonding corrugated filter layer 25 to shaping layer 24 at mask base 26. Corrugated filter layer 25 preferably is juxtaposed over substantially the whole surface of shaping layer 24.

Corrugated filter layer 25 preferably comprises about 1 to 4 corrugations per cm of filter, more preferably 1.5 to 2.5 corrugations per cm. There is about 8 to 20 mm of filter web between two adjacent valleys. The ratio of the length of the filter web to the length of shape-retaining means 16 between two adjacent valleys preferably is greater than 1.5:1, more preferably in the range of 2.0:1 to 1.6:1. Corrugated filter layer 25 is preferably secured to shape-retaining means 16 by intermittent bonds, preferably ultrasonic welds, typically spaced at a distance Y (FIG. 1) of about 0.5 to 5 cm, more typically 1.5 to 3 cm. The intermittent bonds each preferably occupy an area of less than 5 $mm^2$, and more preferably less than 2 $mm^2$. Corrugated filter layer 25 can be assembled in a face mask as described in Example 22 of U.S. Pat. No. 4,807,619 to Dyrud et al., the disclosure of which is incorporated here by reference, by substituting the corrugated filter layer 25 for the electrically-charged polypropylene BMF web. The corrugated filter layer is formed into a preformed filtration body that is subsequently placed over an inner cup-shaped shaping layer and is bonded thereto.

A variety of materials may be used in a shaping layer. For example, a shaping layer may comprise a cup-shaped, open mesh plastic or metal or a molded nonwoven web of fibers. A face mask of this invention typically employs a molded nonwoven web of fibers as a shaping layer. A nonwoven web of fibers can be molded by including thermal bonding components in the fibers, which allow the fibers to become bonded to one another at points of fiber intersection after being cooled. Such thermal bonding fibers are available in single component and bicomponent forms. Bicomponent fibers are the preferred thermal bonding fibers for forming shaping layers because they produce a more openly structured shaping layer. Additionally, staple fibers in crimped or uncrimped form may also be incorporated into the shaping layer. Shaping layers of this kind are well known in the art and have been described in International Application No. PCT/US91/08531, U.S. Pat. No. 4,536,440 to Berg, U.S. Pat. No. 4,807,619 to Dyrud et al., and U.S. Pat. No. 4,827,924 to Japuntich, the disclosures of which are incorporated here by reference. Although the term "shaping layer" is used in this description with the primary purpose of providing shape to a face mask, a shaping layer can also have other functions, which in the case of an outer shaping layer may even be a primary function, such as protection of the corrugated filtration layer and prefiltration of a gaseous stream, or the shaping layer may serve as a means 16 for retaining the corrugated shape of the corrugated filtration layer.

As shown in FIG. 3, a pliable dead-soft band 30 of metal such as aluminum can be provided on mask body 23 to allow it to be shaped to hold the face mask in a desired fitting relationship to the nose of the wearer. Mask body 23 can have an annular mask base 26 that makes a snug fit to the wearer's face by use of straps 28 or other suitable means such as tie strings, an adjustable harness, and the like. Although the cup-shaped mask body 23 has a curved, hemispherical shape, the mask body can take on other shapes. For example, the mask body can be a cup-shaped mask having a construction like the face mask disclosed in U.S. Pat. No. 4,827,924 to Japuntich.

Figure 5:
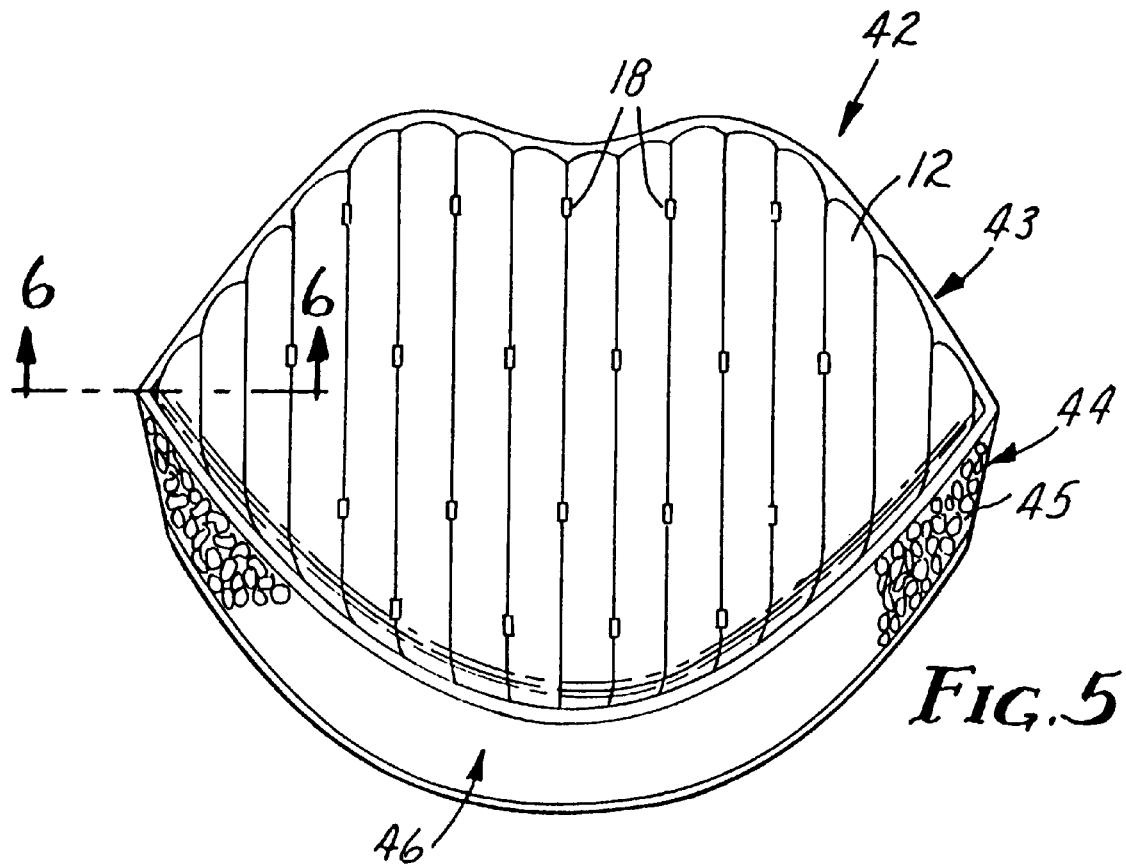
FIG. 5 is a perspective view of a filter 42 suitable for particulate and gaseous contaminant removal in accordance with this invention.
Figure 6:
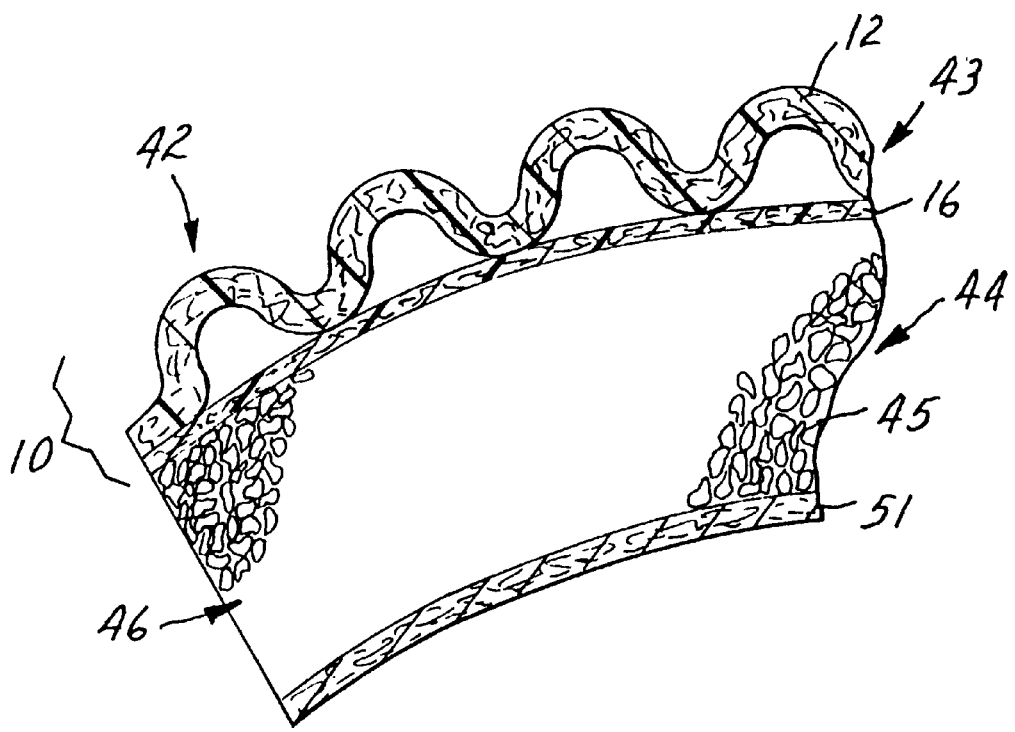
FIG. 6 is a partial cross-section of a filter 42 of FIG. 5 taken along lines 6—6.

In FIGS. 5 and 6, an example of a filter 42 for use in a respirator (not shown) is illustrated. Filter 42 would be used in a respirator that has a fluid-impermeable mask body molded to accommodate filter 42. Filter 42 comprises first and second filter elements 43 and 44 for filtering particulate and gaseous contaminants, respectively.

First filter element 43 removes particulates from the air and includes a corrugated NWPM 12. Corrugated NWPM 12 can be secured to a shape-retaining means 16 as described above to form a composite structure 10. Composite structure 10 can be secured to an outer surface of rigid body 46 to act as a prefilter that filters out particulates to prevent them from entering filter element 43.

Second filter element 44 comprises a sorbent filter material for removing gaseous contaminants. The sorbent material may be in the form of a plurality of sorbent granules 45 united in the form of a rigid body 46 such as described in U.S. Pat. No. 5,033,465 to Braun, the disclosure of which is incorporated here by reference. Such a bonded sorbent structure includes sorbent granules 45 bonded together by polymeric binder particles to form rigid body 46. Rigid body 46 preferably is a unified impact-resistant structure. The sorbent granules are uniformly distributed throughout the rigid body and are spaced to permit a fluid to flow therethrough. The sorbent granules can be, for example, activated carbon granules, and the polymeric binder particles can be, for example, polyurethane, ethylene-vinyl acetate, and polyethylene. A layer 51 of nonwoven fiber can be secured to the surface of rigid body 46 opposite composite structure 10 to protect the sorbent particles from abrasion. Second filter element 44 may also comprise a plurality of loose or unbonded sorbent granules placed together in a container to which the second filter element is secured.

Although the composite structure 10 of the invention has been illustrated as being useful as a filter element, the composite structure 10 also can be used as thermal insulation. In such an instance, the corrugated NWPM preferably contains crimped staple fiber as taught in U.S. Pat. No. 4,118,531 to Hauser. Crimped staple fibers have a continuous wavy, curly, or jagged character along their length and average about 2 to 15 centimeters in length with a crimp count of at least about 2 crimps per centimeter. The crimped staple fibers generally are larger diameter fibers which are randomly and thoroughly intermixed and intertangled with the microfiber and account for approximately at least ten weight percent, and preferably in the range of about 25 to 75 weight percent of the fibers in the web. The staple fibers typically have a percent crimp of at least about fifteen percent, and preferably at least about 25 percent. The webs disclosed in Hauser provide very good thermal insulating efficiency per unit weight and after having been corrugated and united to a shape-retaining means provide a composite structure having good integrity and thermal resistance, making composite structures which utilize such webs valuable insulators for apparel such as jackets, coats, and footwear, including boots, and also for other articles such as sleeping bags. The composite structures may be secured to such articles by adhesive bonding, stitching, gluing, and the like.

Figure 7:
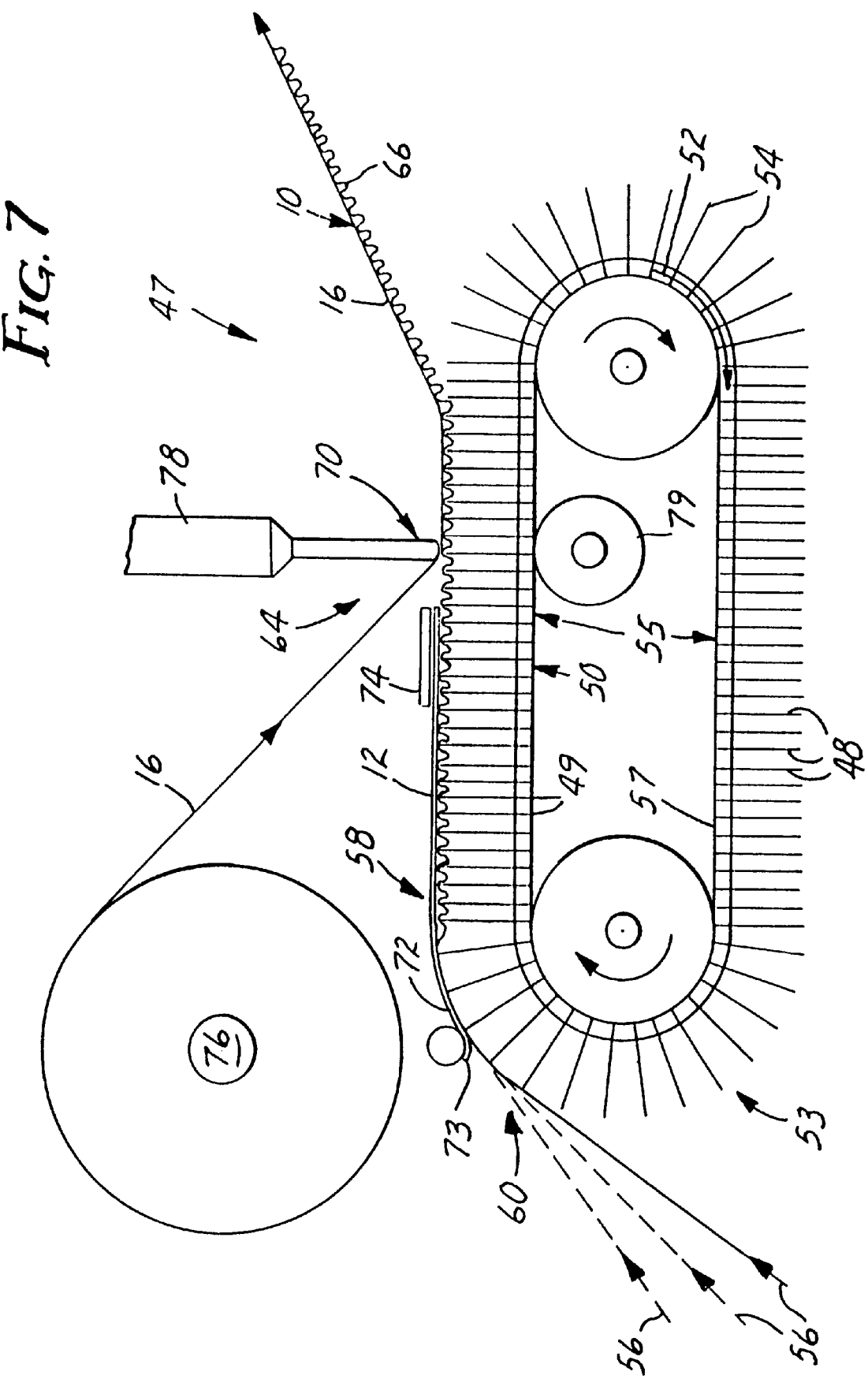
FIG. 7 is a side view of a corrugating apparatus 47 in accordance with this invention.

Turning to FIG. 7, an example of corrugating apparatus 47 of this invention is shown which is useful for continuously making a composite structure according to the method of this invention. The apparatus illustrated in FIG. 7 is particularly advantageous for making a corrugated NWPM. Using the method and apparatus of this invention, a lofty NWPM can be corrugated without tearing the web or substantially increasing its solidity. NWPM are delicate: they can be easily torn and compacted, which conditions can render the NWPM unsuitable for use in a face mask. Torn webs allow contaminants to pass through the face mask, and compacted webs can cause significant increases in pressure drop. Good web loft also is important for thermal insulation. Face masks that have high pressure drops can be very uncomfortable to wear. In accordance with this invention, corrugated NWPM webs can be made without increasing the starting web's solidity by more than 15 percent on average, more preferably by not more than 3 to 5 percent on average. In many embodiments, the solidity of the NWPM is increased by not more than one percent or is so insignificant to be unnoticeable. There is very little contact with the web using the method and apparatus of this invention, and thus the loft or thickness of the web and ultimately the solidity is preserved and lower pressure drops are obtained. Further, the method of retaining the corrugated pattern of the corrugated web provides a maximum ESA on the resulting product.

Corrugating apparatus 47 has a plurality of paddles 48 attached at a first end 49 to a means 50 for moving the paddles about an endless path 52. Each paddle 48 has a second end 54 for supporting a web 56 or 66 (56 designates the starting material or non-corrugated web, and 66 designates the corrugated web) as the paddles move about path 52. Path 52 has a curved portion 53 and a straight portion 55. The second ends 54 of the paddles are able to move toward each other (that is, pitch decreases) as the curved portion 53 approaches the straight portion 55 at region 58 of path 52 to cause web 56 to corrugate.

Means 50 preferably is a single flexible belt 57 (FIG. 8), but may also be, for example, a plurality of spaced parallel flexible belts. By "flexible" is meant the belt can be bent or deflected orthogonal to the machine direction so that the belt can assume a 360 degree path. When the paddle moving means 50 is flexible belt 57, paddles 48 can be embedded in flexible belt 57 at their first end 49 at spaced intervals. The paddles' first ends are preferably embedded in the belt such that the edge of the first end 49 is approximately flush with the inner surface of flexible belt 57. Preferably, at least 70 percent, more preferably at least 85 percent, of the total paddle length extends from the belt 57. Belt 57 preferably is about 5 to 15 mm thick, more preferably 7 to 10 mm thick.

The paddles move in the machine direction with the belt and are constrained to remain normal to a tangent of the flexible belt 57. The spacing of the paddles defines chord length, and so it is important that the paddles' first ends do not move or vibrate laterally in the machine direction. Flexible belt 57 preferably is made from a material that stabilizes the paddles' position so that the chord length in the resulting corrugated web 66 can be kept consistent. A rubber belt having a Shore A durometer in the range of 25 to 90 can be suitable for stabilizing the paddles' position. It has been discovered that a rubber belt made from silicone rubber can adequately constrain the paddles to prevent lateral movement. Examples of suitable silicone rubbers include RTV-630 available from General Electric, and Silastic Type L RTV used in conjunction with a Type E curing agent, both available from Dow Corning.

Figure 8:
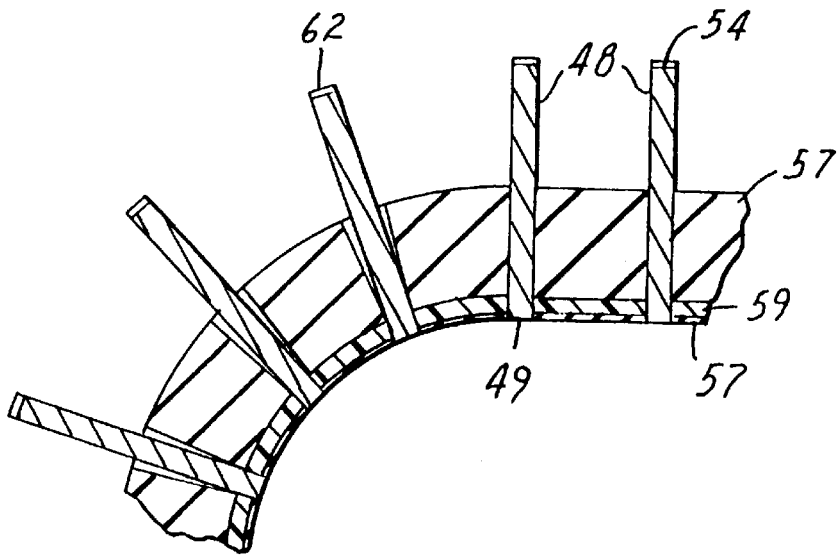
FIG. 8 is an enlarged elevational fragmentary cross-section of a corrugating apparatus in accordance with this invention.
Figure 9:
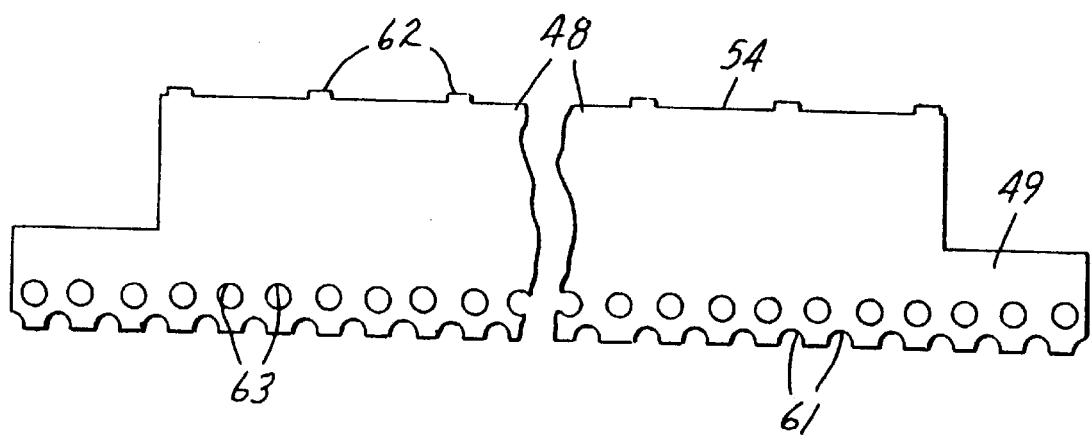
FIG. 9 is a front view of a paddle 48 in accordance with this invention.

As shown in FIG. 8, belt 57 can be further supported by running a plurality of parallel reinforcing members 59 through the belt 57. Parallel reinforcing members 59 are embedded in belt 57 and can be any suitable chord, line, strand, etc. that would not break or unduly stretch under normal operating conditions. As shown in FIG. 9, first end 49 of the paddles 48 can have a plurality of openings 61 to accommodate the parallel reinforcing members 59. Parallel reinforcing members pass through openings 61 throughout belt 57 to assist in the securement of paddles 48 to belt 57. First end 49 of a paddle 48 can also be provided with an irregular configuration including baffles or other openings 63 that promote constrainment of paddles 48 in belt 57.

Corrugating apparatus 47 has a first means 60 for introducing a non-corrugated web 56 to corrugating apparatus 47. First means 60 causes non-corrugated web 56 to make contact with the paddles' second ends 54 upstream to where the non-corrugated web 56 is corrugated at 58. A second means 64 is provided for introducing a means 16 for retaining the corrugated shape of the corrugated web 66. The second means 64 causes the shape-retaining means 16 to make contact with corrugated web 66 downstream to where it is corrugated at 58. A means 70 secures the shape-retaining means 16 to corrugated web 66.

First means 60 for introducing a non-corrugated web 56 to apparatus 47 can include a stationary guiding member 72. Guiding member 72 preferably has a flared end 73 and a curvature that corresponds to the arc created by the second ends 54 of paddles 48 as they move about path 52 on curved portion 53. Guiding member 72 causes non-corrugated web 56 to make contact with the paddles' second ends 54 on the curved portion 53 of path 52. Non-corrugated web 56 will typically feed off a roll or extruder (not shown).

Guiding member 72 can also extend over the straight portion 55 of path 52 to preserve the corrugated condition of web 66. In such a location, member 72 retains the web 66 relative to the paddles' second ends 54 as the paddles 48 move about path 52. A weight 74 or other suitable means can be placed on member 72 to maintain a slight degree of pressure on web 66 at the paddles' second ends 54. In lieu of guiding member 72 to preserve the web's corrugated condition, other means such as air impingement or a circulating contact belt may be employed.

Second means 64 for introducing a shape-retaining means to corrugated web 66 can include, for example, a bobbin 76 that turns to feed a shape-retaining means 16 such as a porous nonwoven sheet (or a plurality of linear bands, filaments, or fibers) that is to be fastened to the corrugated web 66. Shape-retaining means 16 can make contact with corrugated web 66 by using a guiding member with a flared end similar to 73, or as shown in FIG. 7, shape-retaining means 16 can be placed in contact with corrugated web 66 by passing means 16 under securing means 70.

Securing means 70 is a device that attaches corrugated web 66 to shape-retaining means 16. Securing means 70 may be, for example, a thermomechanical bonding apparatus, a melt spinneret system, a pressure roller, and the like. Securing means 70 preferably secures corrugated web 66 to shape-retaining means 16 selectively at valleys 20 of the corrugations. To make a composite structure for a filtering face mask, securing means 70 preferably attaches a corrugated NWPM to a shape-retaining means 16 in a manner that least disturbs the lofty condition of the corrugated nonwoven web.

A preferred securing means 70 for use with a NWPM is a thermomechanical bonding apparatus. A thermomechanical bonding apparatus, such as an ultrasonic welding device, can selectively secure a corrugated web to a shape-retaining means in a manner which least disturbs the lofty condition of a corrugated NWPM, thereby preserving the web's utility as a filter. An ultrasonic welding device has a horn 78 driven by a standard commercially available ultrasonic power device (not shown). The anvil includes paddles 48, and the paddles' second ends 54 act as anvil contact surfaces. Ultrasonic vibrations in horn 78 cause a corrugated web 66 to be melt bonded to the shape-retaining means 16 over the second ends 54 of paddles 48. A supporting member 79 such as a roller is preferably located opposite horn 78 adjacent to paddles' first ends 49. Supporting member 79 assures that web 66 and shape-retaining means 16 absorb the ultrasonic signals to form a bond therebetween, as opposed to allowing paddles 48 to vibrate. The ultrasonic vibrations from horn 78 are preferably concentrated at discreet regions over paddles' second end 54 to form intermittent securement points 18, as shown in FIGS. 1 and 2.

In FIG. 9, a front view of a paddle 48 is shown. Paddle 48 has a plurality of spaced energy concentrators 62 in the form of spaced protrusions on the paddles' second end 54. Energy concentrators 62 cause corrugated web 66 to be bonded to shape-retaining means 16 above each energy concentrator. To make a composite structure 10 that has the staggered spot welds illustrated in FIGS. 1 and 2, the second ends 54 of a paddle is provided with spaced energy concentrators 62 that are offset from the energy concentrators of an adjacent paddle, for example, at approximately one-fourth to one-half the distance between concentrators on adjacent paddles, more preferably at about one-half the distance (see Y FIG. 1). Alternatively, the energy concentrators may be randomly spaced on each paddle. The size of the energy concentrators may vary depending on the number of web layers and the size of the corrugations in the corrugated web, but typically have a top surface area of about 1 to 10 mm$^2$, more typically 2 to 6 mm$^2$. To form a corrugated filtration layer for a face mask, the top surface area of the energy concentrators is about 2 to 4 mm$^2$. In general, the paddles 48 are about 1 to 2 mm thick, and more typically about 1 to 1.5 mm thick.

As shown in FIG. 7, it is possible to contemporaneously corrugate more than one web 56. A plurality of non-corrugated webs 56 (dotted lines) can be fed into the corrugating apparatus 47 simultaneously at 60. When so doing, each web 56 becomes corrugated at the same time as the paddles' second ends 54 move towards each other at 58. Ultrasonic welds or other bonding means can secure corrugated web 66 to a shape-retaining means 16 to provide a coextensive laminate of corrugated webs 66 in the resulting composite structure.

The apparatus of this invention also allows composite structures to be made which have various amounts of corrugated web 66 per a given chord length. The amount or length of the web between two adjacent peaks or valleys 20 is determined by the pitch of the paddles at the point of web introduction. To explain the effect of pitch by way of example, consider adjacent paddles 48 having second ends 54 spaced 1 cm (pitch=1 cm) where web 56 first makes contact with the paddles' second ends 54 on curved portion 53. With the paddles spaced as such, there would be 1 cm of corrugated web 66 between two adjacent peaks or valleys 20 in the resulting composite structure 10. The pitch of the paddles where bonding occurs on straight portion 55 determines the chord length for each individual corrugations. If the paddles have a pitch of 0.5 cm at the point of securement, the chord length will be 0.5 cm between adjacent valleys on the resulting composite structure to provide a corrugation ratio of 2:1.

Figure 10:
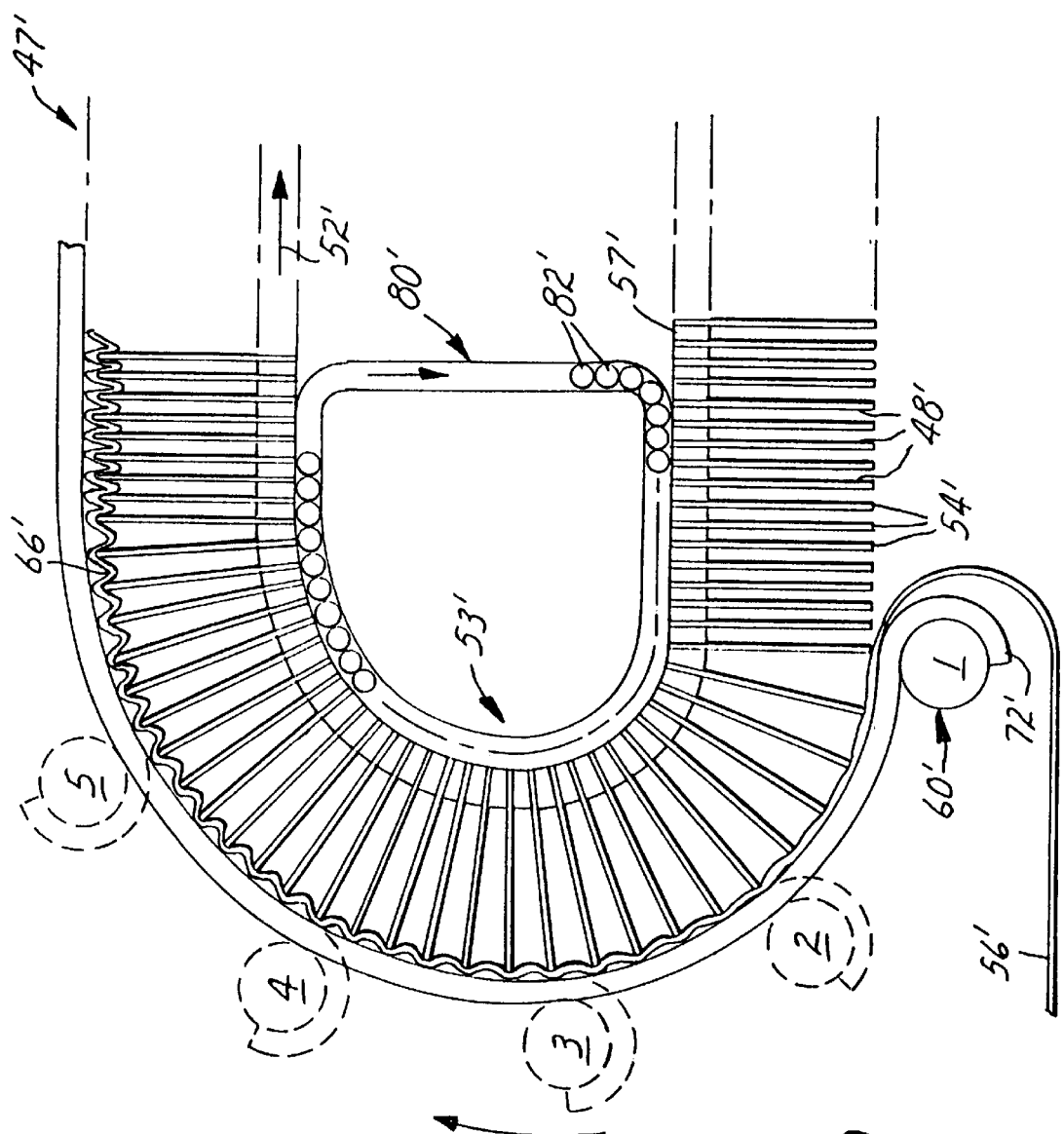
FIG. 10 is a fragmentary side view of an alternative embodiment of a corrugating apparatus 47' in accordance with this invention.

Turning to FIG. 10, an alternative embodiment of a corrugating apparatus 47' is shown. In corrugating apparatus 47' the paddles 48' move about a path 52' that has a curved portion 53' that has a varying bend radius. The varying bend radius causes adjacent second ends 54' to have a decreasing pitch in the direction of paddle movement. This decrease in pitch, in turn, causes web 56' travelling on paddles' second ends 54' to be corrugated. The bend radius in apparatus 47' increases as the paddles 48' move downstream along the curved portion 53'.

Corrugating apparatus 47' has a first means 60' for introducing non-corrugated web 56' to the paddles' second ends 54'. First means 60' preferably has a plurality of locations for introducing non-corrugated web 56' on the curved portion of path 52'. FIG. 10 illustrates five different locations where non-corrugated web 56' can be introduced to apparatus 47'. At location 1, the paddles' second ends 54' are moving at the fastest speed (pitch is the greatest here) and therefore more non-corrugated web 56' will be introduced to the apparatus 47' at that location. This will result in a corrugated web 66' having a greater amount of corrugated web per chord length than, for example, a web introduced at locations 2, 3, 4, or 5. A web 56' introduced at location S would have the least amount of corrugated web 66' per chord length on the resulting composite structure. Therefore, by changing the point of web introduction, the corrugation ratio can be altered when using apparatus 47'.

Belt 57' can be supported over the curved portion 53' of path 52' on a module 80'. Module 80' carries a plurality of movable members such as rollers or balls 82'. Balls 82' rotate and circulate through the module 80' as belt 57' moves about the curved portion 53' of path 52'. When the balls 82' reach the end of the curved portion 53' of path 52', the balls 82' drop to the bottom of module 80' to be recirculated again. Module 80' can be fashioned so that it can be quickly removed and replaced with a module having a different varying bend radius. Thus, as an alternative to introducing the web at various locations along a curve with a varying bend radius, different corrugation ratios may be obtained by holding the point of web introduction constant and varying the bend radius by inserting a module of a different bend radius.

Figure 11:
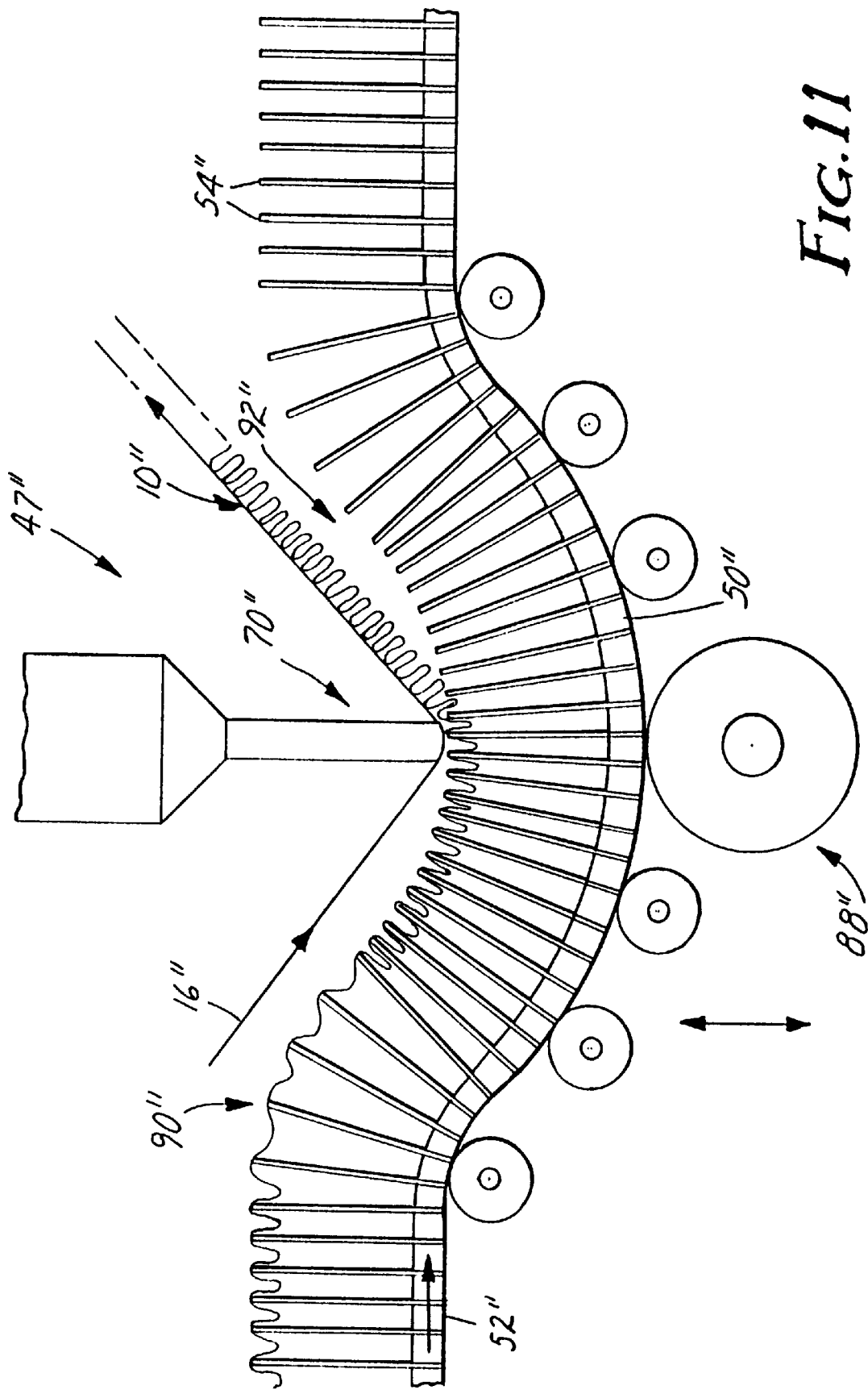
FIG. 11 is a fragmentary side view of a further alternative embodiment of a corrugating apparatus 47" in accordance with this invention.

In FIG. 11, a further alternative embodiment of a corrugating apparatus 47" is shown. Corrugating apparatus 47" has a means 88" for altering the pitch of paddles' second ends 54". Pitch altering means 88" is located along the path 52" adjacent to the means 70" for securing the shape-retaining means 16" to the nonwoven corrugated web 66". The pitch altering means 88" operates by deflecting the paddle moving means 50" in a direction orthogonal to the machine direction (as shown by the vertical double arrow). This deflection occurs where the shape-retaining means 16" is bonded to corrugated web 66". An ultrasonic welding device can be employed in this embodiment to bond corrugated web 66" to a sheet of ultrasonically-bondable fabric or other means such as a plurality of bands, filaments, threads, or fibers. By decreasing the pitch here, there is a decrease in chord length and therefore an increase in the number of corrugations per unit length of the resulting composite structure. To avoid tearing web 66", it is important that the bend radius at 90" is not less than the bend radius at the point of web introduction. It is also important to remove the composite structure 10" from the paddles' second ends 54" before they move apart at bend 92"; otherwise, the composite structure 10" can be damaged. Although FIG. 11 illustrates path 50" being deflected in a manner that causes chord length to decrease, path 50" also could be deflected in the opposite direction to increase chord length.

Other features and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

EXAMPLES

Nonwoven Web of Polymeric Microfiber

The NWPM used in the following examples was an electrically-charged polypropylene BMF web that had an average basis weight of 55 grams per square meter (g/m$^2$), an average thickness of 0.086 cm (0.034 inch) (as measured while applying a 0.1 g/cm$^2$ force using a Low Pressure Thickness Gauge Model No. CS-49-46 available from Custom Scientific Instruments, Inc., Whippany, N.J.), a fiber density $\rho_f$ of 0.91, and a solidity of less than approximately 0.08.

Shape Retaining Means

The shape retaining means used in the following examples was a 16.95 g/m$^2$ (0.5 oz./sq.yd.) CELESTRA nonwoven spunbond polypropylene fabric available from Fiberweb North America, Inc., Simpsonville, S.C.

Web Corrugation

The corrugating apparatus used to fabricate corrugated NWPM in the following examples was similar to the corrugating apparatus shown in FIG. 7. The apparatus had a flexible endless belt 27.9 cm in width and 0.64 cm thick (0.25 inch) and was made from silicone rubber (RTV-630, available from General Electric). Steel paddles were embedded at a first end in the rubber belt such that the edge of the first end was flush with the inside surface of the belt. Nylon chords 1.5 mm (0.06 inch) in diameter (surveyor's snap line) ran through openings 61 (FIG. 9) in the ends of the paddles for reinforcement. The paddles were 0.12 cm (0.047 inch) thick, were 3.18 cm (1.25 inch) high, and were 27.9 cm (11 inches) wide at the embedded first end and 24.1 cm (9.5 inch) wide at the second free end. The paddles embedded ends were spaced center-to-center at 0.64 cm (0.25 inch) as measured on the straight portion of the path. A plurality of spaced energy concentrators were located along the upper edge of the paddles as illustrated in FIG. 9. The concentrators were 0.318 cm (0.125 inch) wide, extended 0.102 cm (0.040 inch) above the paddle edge, and were spaced center-to-center at 3.18 cm (1.25 inch). The concentrators on adjacent paddles were offset by 1.59 cm (0.63 inch). The belt traveled over 6.35 cm (2.5 inch) diameter rollers spaced axis-to-axis at approximately 20 cm (7.875 inches), creating two straight portions on the path of the same length. The flexible belt assembly was driven by a variable speed gear motor.

The corrugation apparatus was equipped with a BRANSON 501 ultrasonic welder assembly with a 2.5:1 booster driving a 17.78 cm (7 inch) wide horn having a 2.54 cm (1 inch) thick face. The welder was driven by a BRANSON 1300P power supply controlled by a variac. The leading and trailing edge of the horn had a slight curvature to facilitate passage of the NWPM and CELESTRA fabric under the horn. The force on the web between the face of the ultrasonic horn and the paddle energy concentrators was regulated by an air pressure cylinder so as to minimize damage to the NWPM.

Using the above-described corrugating apparatus, the resultant corrugated webs had an approximate corrugation ratio of 1.7:1 and the securement points rendered approximately 1.1% of the CSA unavailable for filtering.

During the corrugation process, three parameters were controlled to insure sufficient securement of the NWPM to the CELESTRA fabric without creating holes in the NWPM by "over-welding" or "over-pressure". These three parameters were: 1) the force applied to the NWPM and CELESTRA fabric from the ultrasonic horn and the energy concentrators, 2) the power supplied to the welding horn, and 3) the speed of the corrugating belt. Representative run conditions for producing the corrugated web configurations were as shown in Table 1:

TABLE 1

| Web Configuration | Horn Cylinder Pressure (kg/cm$^2$) | Welder Power (Watts)* | Belt Speed Meters Per Minute (mpm) |
|---|---|---|---|
| 1 Layer NWPM and 1 layer CELESTRA fabric | 0.56 | 1050 | 15.8 |
| 2 Layers NWPM and 1 layer CELESTRA fabric | 0.70 | 1200 | 13.4 |

*Estimated power based on power supplied to welder

The NWPM web and CELESTRA fabric were drawn into the corrugating apparatus by the circulating paddle action and were welded together just above the energy concentrators. After welding the NWPM and the CELESTRA fabric together, the resulting composite structure was removed from the paddles before the free ends of the paddles began to spread at the curved portion of the path.

The configuration of the composite structures that were used in these Examples are shown in FIG. 12, where numeral 12 designates the corrugated NWPM, numeral 14 designates the flat NWPM, and numeral 21 represents the CELESTRA fabric. The flat composite structures are noted as structures a–c, and the composite structures that contain corrugated NWPM are noted as structures a'–c'. Composite structures that contained 2-layers of corrugated NWPM (structure b') were prepared by feeding two flat webs from their respective rolls into the corrugating apparatus in an unbonded, face-to-face configuration. The 3-layer corrugated web (structure c') was prepared from two separate composite structures, namely, a 1-layer corrugated NWPM bonded to a CELESTRA fabric (structure a') and a 2-layer corrugated NWPM bonded to a CELESTRA fabric (structure b'). In this three layer configuration, the individual composite structures were placed in back-to-face contact without being attached to each other.

Pressure Drop and Particle Penetration Testing

Comparative performance of the various filter examples was determined using a method similar to Military Standard MIL-STD-282, wherein the filter configurations were subjected to particulate challenges and the particle concentrations upstream and downstream of the filter were monitored. Testing was conducted on a Model 8110 Automatic Filter Tester (AFT), available from Thermo Systems, Inc., St. Paul, Minn. Each composite structure was challenged with a solid (NaCl) and/or a liquid (dioctyl phthalate, (DOP)) aerosol which were generated from a 2% NaCl solution in distilled water or neat DOP, respectively at flow rates of 85 liters per minute (lpm) as indicated. The NaCl aerosol had a log-normal distribution with a particle size count median diameter of 0.10 micrometers and a geometric standard deviation of 1.9. The DOP aerosol had a log-normal distribution with a particle size count median diameter of 0.19 microns and a geometric standard deviation of 1.5. Aerosol concentration upstream and downstream of the filter was monitored by a photometer with filter penetration calculated by a microprocessor. Testing is automatic with the data for pressure drop, penetration, flow rate, and particulate challenge displayed and logged on an auxiliary computer.

Using the pressure drop and penetration data, a quality factor, Q, can be calculated. The Q factor is a unitless property that measures a filter's performance at a given flow rate for a given filter configuration.

$$\text{Quality Factor} = Q = \frac{-\ln(\text{penetration})}{\text{pressure drop}}$$

The formula for calculating the Q factor is linear relative to the pressure drop, and is exponential relative to the penetration. In a comparison of Q factors by means of a linear analysis, a larger positive Q factor value indicates better filter performance in direct linear proportion.

Examples 1–3 and Comparative Examples C-1 to C-3

All samples tested were circular samples, 13.3 cm (5.25 inches) in diameter that were cut from composite structures having the configurations shown in FIG. 12. The samples were mounted in a sample holder which exposed a circular (diameter of 11.22 cm (4.42 inch)) portion of the sample to the particulate challenge. Flat NWPM samples illustrated in FIG. 12 as composite structures a–c had an ESA of 99 cm² and composite structures a'–c' occupied the same surface area in the sample holder but had a corrugation ratio of 1.7:1 to provide a greatly expanded ESA.

In each example, five (5) samples were tested for the initial penetration and initial pressure drop and the results of these tests were averaged and are reported in Tables 2 and 3. A quality factor, Q, was calculated from the averaged penetration and pressure drop data.

TABLE 2

DOP Challenge

| Example | Structure | Initial Pressure Drop (mmH₂O) | Initial Penetration (percent) | Quality Factor Q | Q Factor Ratio Corr/Flat |
|---|---|---|---|---|---|
| C-1 | a | 4.98 | 29.800 | 0.24 | |
| C-2 | b | 11.34 | 6.564 | 0.24 | |
| C-3 | c | 17.32 | 1.744 | 0.23 | |
| 1 | a' | 3.34 | 24.720 | 0.42 | |
| 2 | b' | 8.72 | 3.824 | 0.37 | |
| 3 | c' | 12.12 | 1.029 | 0.38 | 1.63 |

TABLE 3

NaCl Challenge

| Example | Structure | Initial Pressure Drop (mmH₂O) | Initial Penetration (percent) | Quality Factor Q | Q Factor Ratio Corr/Flat |
|---|---|---|---|---|---|
| C-1 | a | 5.10 | 7.585 | 0.51 | |
| C-2 | b | 11.33 | 0.520 | 0.46 | |
| C-3 | c | 16.76 | 0.075 | 0.43 | |
| 1 | a' | 3.58 | 5.755 | 0.80 | |
| 2 | b' | 8.76 | 0.260 | 0.68 | |
| 3 | c' | 13.36 | 0.023 | 0.63 | 1.50 |

The data in Tables 2 and 3 illustrates the superior performance of the composite structures of this invention. In Examples 1–3, the corrugated configurations a'–c' of this invention provided lower pressure drops, lower penetration values, and larger Q factors as compared to the non-corrugated composite structures a–c of comparative examples C-1 to C-3, respectively.

The average Q factors for a DOP challenge aerosol are 0.39 for composite structures a'–c' of Examples 1–3 and are 0.24 for composite structures a–c of Comparative Examples C-1 through C-3. The ratio of these two averaged Q factors (Q corrugated/Q flat) is 1.63. Similarly, the average Q factors for NaCl are 0.70 for composite structures a'–c' of Examples 1–3 and are 0.47 for composite structures a–c of Comparative Examples C-1 through C-3. These two averaged Q factors give a ratio (Q corrugated/Q flat) of 1.50. The 1.63 and 1.50 ratios demonstrate that this invention provides a Q factor improvement in performance of 63% and 50%, respectively.

Service Life Testing

Composite structures a–c and a'–c' shown in FIG. 12 were tested for service life by measuring pressure drop and penetration while exposed to a particulate challenge over certain periods of time. The particle challenge was sodium chloride. Pressure drop and particle penetration were sampled every minute over a time span of at least twenty-five minutes. Each structure (a–c and a'–c') was tested in five separate trials. The data for the five separate trials was averaged and the averaged pressure drop, penetration, and Q factor data is reported in Table 4, where pressure drop is abbreviated as ΔP, and penetration is abbreviated as "Pen.".

TABLE 4

Service Life Tests for Flat Composite Structures of this Invention

| Example | Structure | | Approximate Elapsed Time (minutes) | | | | | |
|---|---|---|---|---|---|---|---|---|
| | | | 1 | 5 | 10 | 15 | 20 | 25 |
| C-1 | a | ΔP (H₂O) | 5.17 | 9.47 | 16.33 | 33.83 | 83.80 | 157.83 |
| | | Pen. (%) | 8.583 | 3.270 | 1.517 | 0.231 | 0.005 | 0.001 |
| | | Q Factor | 0.48 | 0.36 | 0.26 | 0.18 | 0.12 | 0.07 |
| C-2 | b | ΔP (H₂O) | 11.93 | 16.83 | 24.60 | 46.10 | 103.50 | 181.50 |
| | | Pen. (%) | 0.769 | 0.220 | 0.103 | 0.013 | 0.001 | 0.001 |
| | | Q Factor | 0.41 | 0.36 | 0.29 | 0.19 | 0.11 | 0.06 |
| C-3 | c | ΔP (H₂O) | 18.93 | 24.27 | 32.20 | 55.80 | 118.63 | 207.50 |
| | | Pen. (%) | 0.078 | 0.024 | 0.011 | 0.001 | 0.001 | 0.001 |
| | | Q Factor | 0.38 | 0.34 | 0.28 | 0.21 | 0.10 | 0.06 |
| | | Avg. Q Factor | 0.42 | 0.36 | 0.27 | 0.19 | 0.11 | 0.06 |
| 1 | a' | ΔP (H₂O) | 4.10 | 6.37 | 9.27 | 13.30 | 20.03 | 32.83 |
| | | Pen. (%) | 5.880 | 2.167 | 1.587 | 0.870 | 0.322 | 0.072 |
| | | Q Factor | 0.69 | 0.57 | 0.45 | 0.36 | 0.29 | 0.22 |
| 2 | b' | ΔP (H₂O) | 9.37 | 11.80 | 14.66 | 18.70 | 25.20 | 36.93 |
| | | Pen. (%) | 0.274 | 0.111 | 0.070 | 0.041 | 0.017 | 0.005 |
| | | Q Factor | 0.63 | 0.58 | 0.49 | 0.42 | 0.35 | 0.27 |
| 3 | c' | ΔP (H₂O) | 13.60 | 16.10 | 19.00 | 23.00 | 29.63 | 45.56 |
| | | Pen. (%) | 0.040 | 0.017 | 0.011 | 0.006 | 0.002 | 0.001 |
| | | Q Factor | 0.38 | 0.58 | 0.54 | 0.48 | 0.42 | 0.27 |
| | | Avg. Q Factor | 0.63 | 0.56 | 0.47 | 0.40 | 0.33 | 0.25 |
| Average Q Factor Ratio (Corr./Flat) | | | 1.50 | 1.58 | 1.74 | 2.07 | 3.08 | 3.96 |

Figure 13:
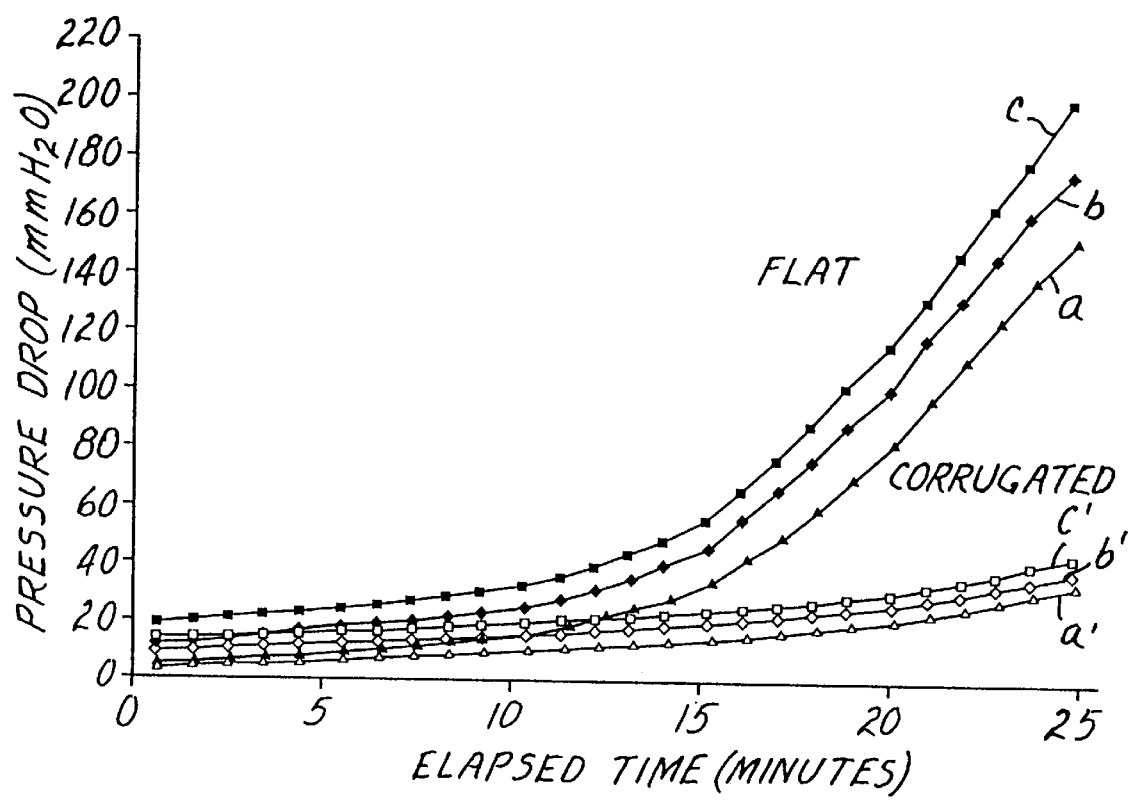
FIG. 13 is plot of pressure drop as a function of time for sodium chloride loading for the experiments of Examples 1–3 and C-1 to C-3.

The data set forth in Table 4 demonstrates that, as the sodium chloride particulates were deposited on the corrugated and flat composite structures, the pressure drop for the flat composite structures (a–c) increased significantly, whereas the composite structures that contain corrugated NWPM (a'–c') do not demonstrate such significant pressure drop increases. FIG. 13 shows the superior pressure drop values that are obtained by the composite structures of the invention, where pressure drop is plotted as a function of time. The flat NWPM configurations (a–c) show a significant change in the slope of the plot at approximately 12 minutes; whereas the composite structures that contain corrugated NWPM (a'–c') showed very little increase in pressure drop up to 25 minutes, and the change in slope for the corrugated NWPM (a'–c') is much less than that of the flat composite structures (a–c).

A comparison of the average Q factors for the corrugated and flat web composite structures at the indicated time intervals shows that at the one minute interval, the ratio is 1.50 which is identical to the ratio set forth in Table 3 for the NaCl initial exposure. As the elapsed time increases, however, the ratio of Q factors (Q corrugated/Q flat) increases to almost 4 at 25 minutes, thus demonstrating a large magnitude of better performance with this invention.

Web Thickness Testing and Solidity Determination

The impact of the corrugating apparatus and method of this invention on web thickness was tested. Solidity is a function of web thickness, and thus to provide a web of low solidity, it is important to not decrease web thickness. This web thickness testing demonstrated that no decrease in web thickness occurred and therefore solidity was preserved when a NWPM was corrugated in accordance with this invention.

Corrugated webs cannot be measured for web thickness using the Low Pressure Thickness Gauge device described above. Thus, in these examples another technique (referred to as the Impregnation Method) was employed to determine the thickness of a corrugated web. The thickness of the flat webs of composite structures a and b and corrugated webs of composite structures a' and b' shown in FIG. 12 were determined using the Impregnation Method by impregnating cut-out sections of the flat webs and the composite structures that contained corrugated NWPM in a low viscosity resin, SCOTCHCAST Electrical Resin #8 (available from 3M Company, St. Paul, Minn.). The resin was polymerized over a 24-hour period to freeze the corrugated web configuration. The flat and corrugated web samples were then microtomed on the web edge to create an approximately 0.1 mm thick cross-web profile of the web configuration. The corrugated samples were cut from selected areas of the composite structure where securement points were not present to achieve a better comparison to the flat NWPM. The cut samples were then mounted on glass slides, illuminated, and magnified with an INFINIVAR Video Inspection Microscope (available from Infinity Photo-Optical Company, Boulder, Colo.). Images were electronically captured with a CCD (charge coupled device) camera, and data was stored for image analysis. The imaging system was a QUANTI-MET Model Q-570 Image Analyzer Model (available from Leica Instruments, Deerfield, Ill.) having the capability to analyze the image, determine the NWPM boundaries, and calculate NWPM thickness regardless of the web pattern. Solidity was calculated from the web thickness.

This measurement procedure was completed for a minimum of two trials for three samples of each structure. The data was averaged and is set forth in Table 5 as such.

TABLE 5

| Example | Structure | Average Thickness (mm) Per Layer | Average Solidity |
| --- | --- | --- | --- |
| C-1 | a | 1.21 | 0.050 |
| 1 | a' | 1.25 | 0.048 |
| C-2 | b | 0.92 | 0.055 |
| 2 | b' | 0.96 | 0.053 |

The data in Table 5 shows that there is no significant decrease in web thickness or increase in web solidity when the NWPM is corrugated using the method and apparatus of this invention. Indeed, the data shows that web thickness increased slightly and solidity decreased; however, the increase in thickness and decrease in solidity is within the experimental error. Accordingly, the loft of the NWPM is preserved.

Comparative Examples C-4 to C-8

The following comparative examples were conducted to demonstrate the delicacy of nonwoven webs of polymeric microfiber and the deleterious effects that are incurred when such webs are compacted. In comparative Examples C-5 to C-8, the nonwoven webs of polymeric microfiber were compacted under various degrees of compressive stress. Example C-4 is a non-compacted control sample.

A 25.4 cm wide portion of the NWPM was cut into a number of 13.34 cm diameter disks. The disks were weighed individually and stacked (5 disks per stack) with paper interleaves between each of the disks. The stack position of each sample was maintained for data integrity. Sample thicknesses were measured using a 2.86 cm diameter circular flat bottomed pressure foot attached to a digital thickness gage capable of distance measurements accurate to $2 \times 10^{-3}$ mm. The circular foot and movable gage element combined to weigh 36 grams, resulting in a measurement pressure of $5.5 \times 10^{-3}$ bar.

In Comparative Examples C-5 through C-8, the NWPM samples were compressed using a 10.16 cm inside diameter air cylinder acting vertically through a 12.7 cm diameter metal plate. Adjustment of compressive stress delivered through the plate onto the nonwoven webs was controlled by a standard air pressure regulator. Each NWPM sample was held under the indicated compression for 30 minutes to compact the sample prior to evaluating the filtration performance of the NWPM sample. Thickness readings were taken prior to compaction, immediately following compaction, and within approximately 10 minutes after filtration testing, and solidity was calculated therefrom. Filtration testing was performed approximately 10 minutes after compaction. The NWPM samples were tested for particle penetration, and the results of the testing are reported in Table 6 as an average of five samples.

TABLE 6

Thickness, Solidity, and Filtration Performance of Nonwoven Webs of Polymeric Microfiber Subjected to Various Compressive Stress

| | Sample | Before Compression | | Surface Normal | After Compression | | Filtration Results | | | After Filtration | |
|---|---|---|---|---|---|---|---|---|---|---|---|
| | | | | | | | Initial Pressure | Initial | | | |
| Example | Weight (grams) | Thickness (cm) | Solidity (Unitless) | Compression (Bar) | Thickness (cm) | Solidity (Unitless) | Drop (mmH$_2$O) | Penetration (% NaCl) | Q | Thickness (cm) | Solidity (Unitless) |
| C-4* | 0.804 | 0.081 | 0.077 | 0 | 0.081 | 0.077 | 5.0 | 8.04 | 0.51 | 0.081 | 0.077 |
| C-5 | 0.844 | 0.093 | 0.070 | 1 | 0.063 | 0.104 | 7.2 | 4.54 | 0.43 | 0.074 | 0.089 |
| C-6 | 0.768 | 0.090 | 0.066 | 2 | 0.055 | 0.108 | 7.3 | 6.11 | 0.39 | 0.063 | 0.095 |
| C-7 | 0.796 | 0.090 | 0.069 | 3 | 0.049 | 0.126 | 8.7 | 5.22 | 0.34 | 0.062 | 0.100 |
| C-8 | 0.816 | 0.080 | 0.079 | 4 | 0.044 | 0.144 | 9.8 | 5.18 | 0.31 | 0.055 | 0.115 |

*Non-compacted control sample

The data in Table 6 demonstrates that slight compressive stresses will compact a NWPM, causing an increase in solidity and pressure drop and a decrease in the quality factor, Q. The compacted NWPM of Comparative Examples C-15 through C-18 did not perform nearly as well as the non-compacted NWPM of Comparative Example C-14.

Comparative Examples C-9 through C-16

In these Examples, the NWPM was corrugated using a gear corrugating machine having identical 35.56 cm wide gears of 19.05 cm pitch circle diameter. The gear teeth were spaced at 0.3386 cm circular pitch. The gear rolls were spaced from each other at an optimum partially meshing condition to form a distinct corrugation pattern without crushing the microfiber web more than necessary to achieve the corrugation pattern. The uppermost gear was held at 20° C. and the other gear at 79° C. using tempered circulating water. As shown in Table 7, the peripheral speed of both gear rolls was adjusted between 3.05 and 21.34 meters per minute (mpm). The NWPM was passed through the meshing zone of the gears as they rotated in opposite directions, forming a corrugated NWPM having a plurality of generally parallel and evenly spaced corrugations.

The corrugated structure of the NWPM was maintained by depositing spaced parallel strands of molten polypropylene (WRS-6, Lot 197, available from Shell Oil Co.) on the structure transverse to the parallel corrugations at a center to center spacing of 0.25 cm. The polypropylene strands were dropped vertically downward from a spinning die at a temperature of 242° C. onto the peaks of the parallel corrugations. The polypropylene strands were melt bonded to the corrugated NWPM and were allowed to cool under ambient conditions.

Comparative Example C-16 is a flat, non-corrugated NWPM taken from the same lot as Comparative Examples C-9 through C-15. Pressure drop and penetration testing was performed as described above, the results of which are reported in Table 7.

Example 4

In this Example, a NWPM taken from the same lot as Examples C-9 to C-16 was corrugated as described in Example 1 to form a composite structure having the configuration a' shown in FIG. 12. The bonds to the shape-retaining means were sized so that the ESA of this composite structure is approximately the same as the ESA of Examples C-9 to C-15.

TABLE 7

Comparison of a Corrugated Nonwoven Webs of Present Invention to Non-corrugated and Gear Corrugated Nonwoven Webs

| Example | Strand Diameter (mm) | Machine Direction Process Speed (mpm) | Initial Pressure Drop (mmH$_2$O) | Initial Penetration (% NaCl) | Q |
|---|---|---|---|---|---|
| C-9* | 0.96 | 3.05 | 6.58 | 7.24 | 0.40 |
| C-10* | 0.68 | 6.10 | 6.46 | 6.90 | 0.41 |
| C-11* | 0.56 | 9.15 | 6.04 | 8.64 | 0.41 |
| C-12* | 0.48 | 12.20 | 5.54 | 8.80 | 0.44 |
| C-13* | 0.43 | 15.24 | 4.75 | 9.33 | 0.50 |
| C-14* | 0.38 | 18.29 | 5.12 | 8.94 | 0.47 |
| C-15* | 0.33 | 21.34 | 4.78 | 8.28 | 0.52 |
| Average Values for C-9 to C-15 | | | 5.61 | 8.30 | 0.45 |
| C-16** | | | 5.36 | 8.56 | 0.46 |
| 4 | | | 4.52 | 5.36 | 0.65 |

*Gear Corrugated Samples
**Non-corrugated control sample

The data set forth in Table 7 demonstrates that the Q factor for the composite structure of this invention (Example 4) is far superior to the Q factors for the gear corrugated samples (Examples C-9 to C-15). The gear corrugated samples (average Q factor 0.45) demonstrated no gain in filtration performance over the non-corrugated sample (Q factor 0.46) of the same NWPM (Example C-16).

Examples 5–17

The purpose of these Examples is to show that composite structures of the invention can provide good thermal insulating properties.

The NWPM used in these Examples contained a mixture of microfibers and crimped staple fibers. The NWPM was made as described in U.S. Pat. No. 4,118,531 to Hauser. The NWPM contained 65 weight percent polypropylene (Fina 3860x, Houston, Tex.) microfiber and 35 weight percent polyester staple fibers (Hoechst Celanese, Charlotte, N.C.) that had a staple length of about 3.81 cm (1.5 inches) and 6 denier per filament. The microfiber had an arithmetic median fiber diameter of approximately 7 micrometers. The staple fibers had about 2.4 crimps per centimeter. The composite structures were prepared as described in Examples 1–3. A single layer of CELESTRA nonwoven spunbond polypropylene fabric was employed as a shape-retaining means. Each composite structure had a size of 10 cm by 10 cm and was configured as outlined below in Table 8:

TABLE 8

| Example | Basis Weight of NWPM (gm/m²) | Number of Layers | Corrugation Pitch (mm) |
|---|---|---|---|
| 5 | 40 | 1 | 9.52 |
| 6 | 40 | 2 | 9.52 |
| 7 | 40 | 3 | 9.52 |
| 8 | 40 | 1 | 4.76 |
| 9 | 40 | 2 | 4.76 |
| 10 | 40 | 3 | 4.76 |
| 11 | 100 | 1 | 9.52 |
| 12 | 100 | 2 | 9.52 |
| 13 | 100 | 3 | 9.52 |
| 14 | 100 | 1 | 4.76 |
| 15 | 100 | 2 | 4.76 |
| 16 | 200 | 1 | 9.52 |
| 17 | 200 | 1 | 4.76 |

The composite structures were tested for thermal resistance using a Rapid-K™ test unit available from Dynatech R&D Company, Cambridge, Mass. The Thermal resistance measurements were conducted according to ASTM Test Method C518. The results of the thermal resistance tests are set forth in Table 9, where do values are provided to illustrate the thermal resistance. Clo is defined mathematically as

TABLE 9

| Example No. | Base Weight (g/m²) | Thermal Resistance (Clo) | Clo Per Unit Weight (× 1000) |
|---|---|---|---|
| 5 | 74 | 1.084 | 14.6 |
| 6 | 174 | 1.465 | 8.42 |
| 7 | 237 | 1.549 | 6.53 |
| 8 | 90 | 0.758 | 8.42 |
| 9 | 162 | 1.015 | 6.26 |
| 10 | 243 | 1.299 | 5.34 |
| 11 | 180 | 1.568 | 8.71 |
| 12 | 360 | 1.775 | 4.93 |
| 13 | 619 | 2.165 | 3.49 |
| 14 | 197 | 1.035 | 5.25 |
| 15 | 370 | 1.61 | 4.35 |
| 16 | 370 | 1.808 | 4.88 |
| 17 | 349 | 1.161 | 3.32 |
| C-17[a] | 207 | 0.624 | 3.01 |
| C-18[b] | 412 | 1.475 | 3.58 |

[a]This sample was 3M commericial product Thinsulate ® B-200, which is an embossed nonwoven web that has the same fiber composition as the NWPM of Examples 5–17.
[b]This sample was 3M commercial product Thinsulate ® B-400, which is an embossed nonwoven web that has the same fiber composition as the NWPM of Examples 5–17.

$$1clo = \frac{(0.18°C.)(meter)^2(hour)}{(kilometers)}.$$

The data in Table 9 show that the thermal insulation of the invention can demonstrate good thermal resistance. The data also show that the thermal insulation of the invention can demonstrate better do values per unit weight than embossed products. A non-embossed, non-corrugated sample would, in most instances, demonstrate better clo values per unit weight than the thermal insulation of the invention; however, the former would, as indicated in the Background, lack satisfactory web integrity to allow the web to be adhered to another surface and to allow the web to maintain a cohesive structure after being exposed to abrasion.

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

What is claimed is:

1. Apparel having a thermal insulation secured thereto where the thermal insulation comprises:

a corrugated nonwoven web and a means for retaining the corrugated shape of the corrugated nonwoven web;

the corrugated nonwoven web having a solidity of 0.1 or less and containing microfiber and crimped staple fibers that have a percent crimp of at least fifteen percent, the shape-retaining means being secured to valleys of the corrugations in the corrugated nonwoven web such that the shape-retaining means is not coextensive with the corrugated nonwoven web.

2. The apparel of claim 1, wherein the thermal insulation is secured thereto by adhesive bonding, stitching, or gluing.

3. The apparel of claim 1, wherein the thermal insulation is secured thereto by adhesive bonding.

4. The apparel of claim 1, wherein 25 to 75 weight percent of the fibers in the nonwoven web are crimped staple fibers having a percent crimp of at least fifteen percent, and 75 to 25 weight percent of the fibers are microfibers.

5. The apparel of claim 1, wherein the corrugated nonwoven web has a solidity in the range of 0.008 to 0.07.

6. The apparel of claim 1, wherein the corrugated nonwoven web has a peak to valley height of 4 to 50 millimeters.

7. The apparel of claim 1, wherein the corrugated nonwoven web has a pore size of 15 to 100 micrometers.

8. The apparel of claim 1, wherein the corrugations are generally parallel corrugations and the shape-retaining means is intermittently bonded to the valleys of the corrugations.

9. Apparel having a thermal insulation secured thereto where the thermal insulation comprises:

a corrugated nonwoven web and a member that is capable of retaining the corrugated shape of the corrugated nonwoven web;

the corrugated nonwoven web having a solidity of 0.1 or less and containing microfiber and crimped staple fibers that have a percent crimp of at least fifteen percent, the member being secured to valleys of the corrugations in the corrugated nonwoven web such that the shape-retaining member is not coextensive with the corrugated nonwoven web.

* * * * *